US012719857B2

(12) United States Patent
Raman et al.

(10) Patent No.: US 12,719,857 B2
(45) Date of Patent: Aug. 25, 2026

(54) METHOD AND APPARATUS FOR USER AUTHENTICATION AND ACTION PROCESSING

(71) Applicant: JPMorgan Chase Bank, N.A., New York, NY (US)

(72) Inventors: Kasthuri Rangan Raman, Glen Mills, PA (US); Deepali Shah, Valrico, FL (US); Mohamedabdullah Mohamed Uthuman, Frisco, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 112 days.

(21) Appl. No.: 18/766,262

(22) Filed: Jul. 8, 2024

(65) Prior Publication Data

US 2026/0012449 A1 Jan. 8, 2026

(51) Int. Cl.
*H04L 9/40* (2022.01)

(52) U.S. Cl.
CPC .......... *H04L 63/083* (2013.01); *H04L 63/105* (2013.01)

(58) Field of Classification Search
CPC ............................ H04L 63/083; H04L 63/105
USPC ............................................................ 726/4
See application file for complete search history.

(56) References Cited

U.S. PATENT DOCUMENTS 8,539,557 B1 * 9/2013 Buckner ................ G06F 21/31 726/4
8,914,851 B2 * 12/2014 Fakhrai .............. H04L 63/0815 726/4
10,366,391 B2 * 7/2019 Dimmick ............... G06Q 20/40
11,343,237 B1 * 5/2022 Natarajan ............. H04L 63/126
2001/0044729 A1 * 11/2001 Pomerance .......... G06Q 50/182 705/309
2017/0201550 A1 * 7/2017 Benson ............... H04L 63/0815
2020/0380506 A1 * 12/2020 Chang ................ H04L 63/0876
2023/0024880 A1 * 1/2023 Wurmfeld ............ H04W 12/79
2024/0154968 A1 * 5/2024 Kwon ................ H04L 63/0815

OTHER PUBLICATIONS

Secure Brokered Delegation Through DelegaTEE, Schneider et al, May 2019 (Year: 2019).*

* cited by examiner

*Primary Examiner* — Jahangir Kabir
(74) *Attorney, Agent, or Firm* — GUNTIN & GUST, PLC; Atanu Das

(57) ABSTRACT

Aspects of the subject disclosure may include, for example, receiving communications that originate from a computer used by a user associated with a merchant, wherein the communications comprise credential information that is used to authenticate the user and that corresponds to a role via which the user will perform an action; responsive to receipt of the credential information, authenticating access to a product platform, wherein the product platform is configured to facilitate a plurality of action types; responsive to the authenticating of the access to the product platform and in accordance with the role, selecting as permitted to be performed by the user a particular one of the action types; and facilitating on the product platform the action of the particular action type by the user while concurrently prohibiting an action on the product platform of a different action type by the user. Other embodiments are disclosed.

20 Claims, 33 Drawing Sheets

Receiving first communications that originate from a first computer used by a first user of a plurality of users associated with a merchant, wherein the first communications comprise first credential information that is used to authenticate the first user and that corresponds to a first role via which the first user will perform a first action -- 3002

Responsive to receipt of the first credential information, authenticating access to a product platform, wherein the authenticating of the access is based at least in part upon the first credential information, wherein the product platform is configured to facilitate a plurality of action types wherein the plurality of action types comprises a first action type and a second action type, and wherein the second action type is an action type that is different from the first action type - 3004

Responsive to the authenticating of the access to the product platform and in accordance with the first role, selecting as permitted to be performed by the first user the first action type -- 3006

Facilitating on the product platform the first action of the first action type by the first user while concurrently prohibiting an action on the product platform of the second action type by the first user-- 3008

Receiving second communications that originate from a second computer used by a second user of the plurality of users associated with the merchant, wherein the second communications comprise second credential information that is used to authenticate the second user and that corresponds to a second role via which the second user will perform a second action, wherein the second role is a different role from the first role -- 3010

Responsive to receipt of the second credential information, further authenticating access to the product platform, wherein the further authenticating of the access is based at least in part upon the second credential information -- 3012

Responsive to the further authenticating of the access to the product platform and in accordance with the second role, selecting as permitted to be performed by the second user the second action type -- 3014

Facilitating on the product platform the second action of the second action type by the second user while concurrently prohibiting an action on the product platform of the first action type by the second user-- 3016

3000

Receiving first communications that originate from a first computer used by a first user of a plurality of users associated with a merchant, wherein the first communications comprise first credential information that is used to authenticate the first user and that corresponds to a first role via which the first user will perform a first action -- 3002

Responsive to receipt of the first credential information, authenticating access to a product platform, wherein the authenticating of the access is based at least in part upon the first credential information, wherein the product platform is configured to facilitate a plurality of action types wherein the plurality of action types comprises a first action type and a second action type, and wherein the second action type is an action type that is different from the first action type -- 3004

Responsive to the authenticating of the access to the product platform and in accordance with the first role, selecting as permitted to be performed by the first user the first action type -- 3006

Facilitating on the product platform the first action of the first action type by the first user while concurrently prohibiting an action on the product platform of the second action type by the first user-- 3008

Receiving second communications that originate from a second computer used by a second user of the plurality of users associated with the merchant, wherein the second communications comprise second credential information that is used to authenticate the second user and that corresponds to a second role via which the second user will perform a second action, wherein the second role is a different role from the first role -- 3010

Responsive to receipt of the second credential information, further authenticating access to the product platform, wherein the further authenticating of the access is based at least in part upon the second credential information -- 3012

Responsive to the further authenticating of the access to the product platform and in accordance with the second role, selecting as permitted to be performed by the second user the second action type -- 3014

Facilitating on the product platform the second action of the second action type by the second user while concurrently prohibiting an action on the product platform of the first action type by the second user-- 3016

Figure 3B:
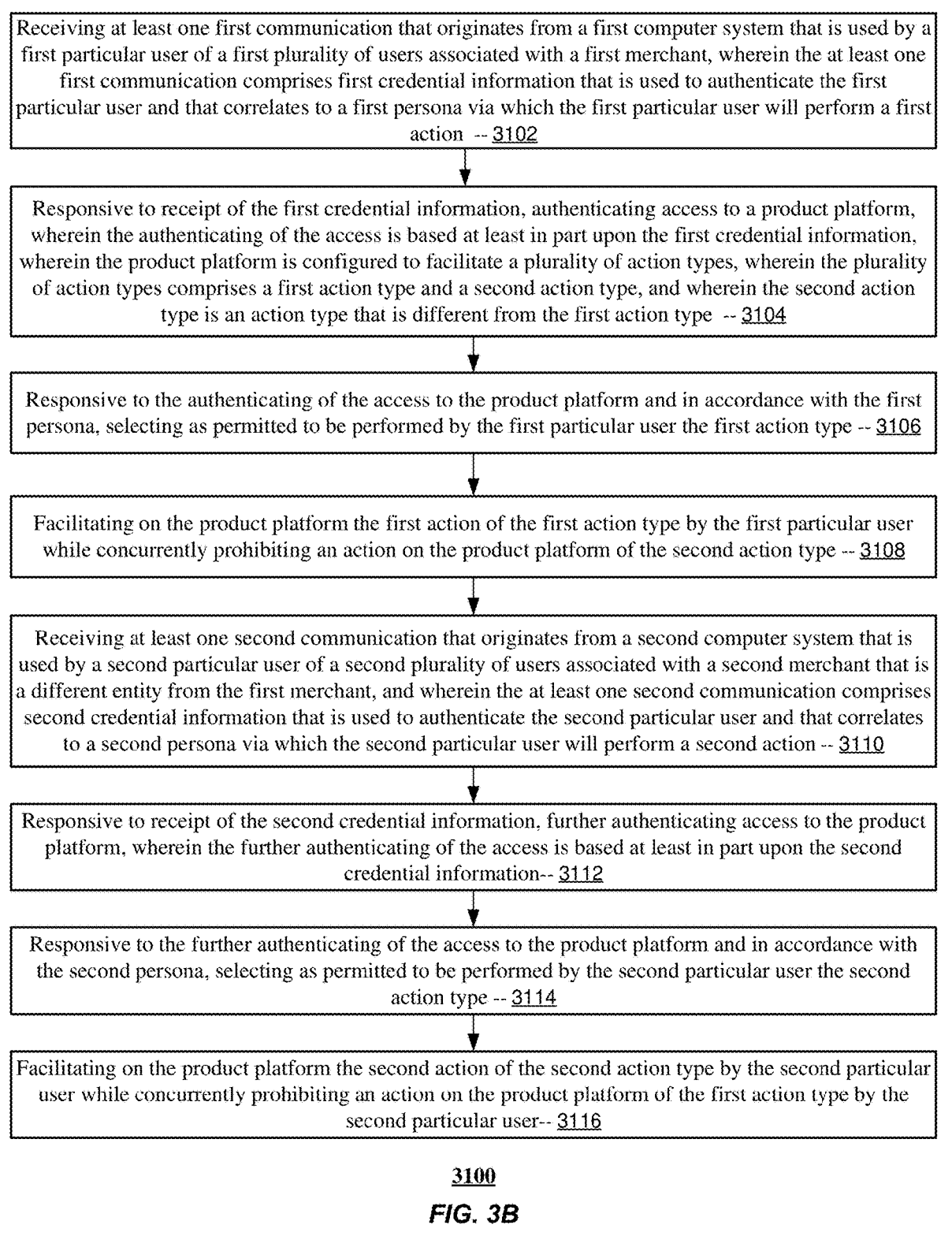

Receiving at least one first communication that originates from a first computer system that is used by a first particular user of a first plurality of users associated with a first merchant, wherein the at least one first communication comprises first credential information that is used to authenticate the first particular user and that correlates to a first persona via which the first particular user will perform a first action -- 3102

Responsive to receipt of the first credential information, authenticating access to a product platform, wherein the authenticating of the access is based at least in part upon the first credential information, wherein the product platform is configured to facilitate a plurality of action types, wherein the plurality of action types comprises a first action type and a second action type, and wherein the second action type is an action type that is different from the first action type -- 3104

Responsive to the authenticating of the access to the product platform and in accordance with the first persona, selecting as permitted to be performed by the first particular user the first action type -- 3106

Facilitating on the product platform the first action of the first action type by the first particular user while concurrently prohibiting an action on the product platform of the second action type -- 3108

Receiving at least one second communication that originates from a second computer system that is used by a second particular user of a second plurality of users associated with a second merchant that is a different entity from the first merchant, and wherein the at least one second communication comprises second credential information that is used to authenticate the second particular user and that correlates to a second persona via which the second particular user will perform a second action -- 3110

Responsive to receipt of the second credential information, further authenticating access to the product platform, wherein the further authenticating of the access is based at least in part upon the second credential information-- 3112

Responsive to the further authenticating of the access to the product platform and in accordance with the second persona, selecting as permitted to be performed by the second particular user the second action type -- 3114

Facilitating on the product platform the second action of the second action type by the second particular user while concurrently prohibiting an action on the product platform of the first action type by the second particular user-- 3116

Figure 3C:
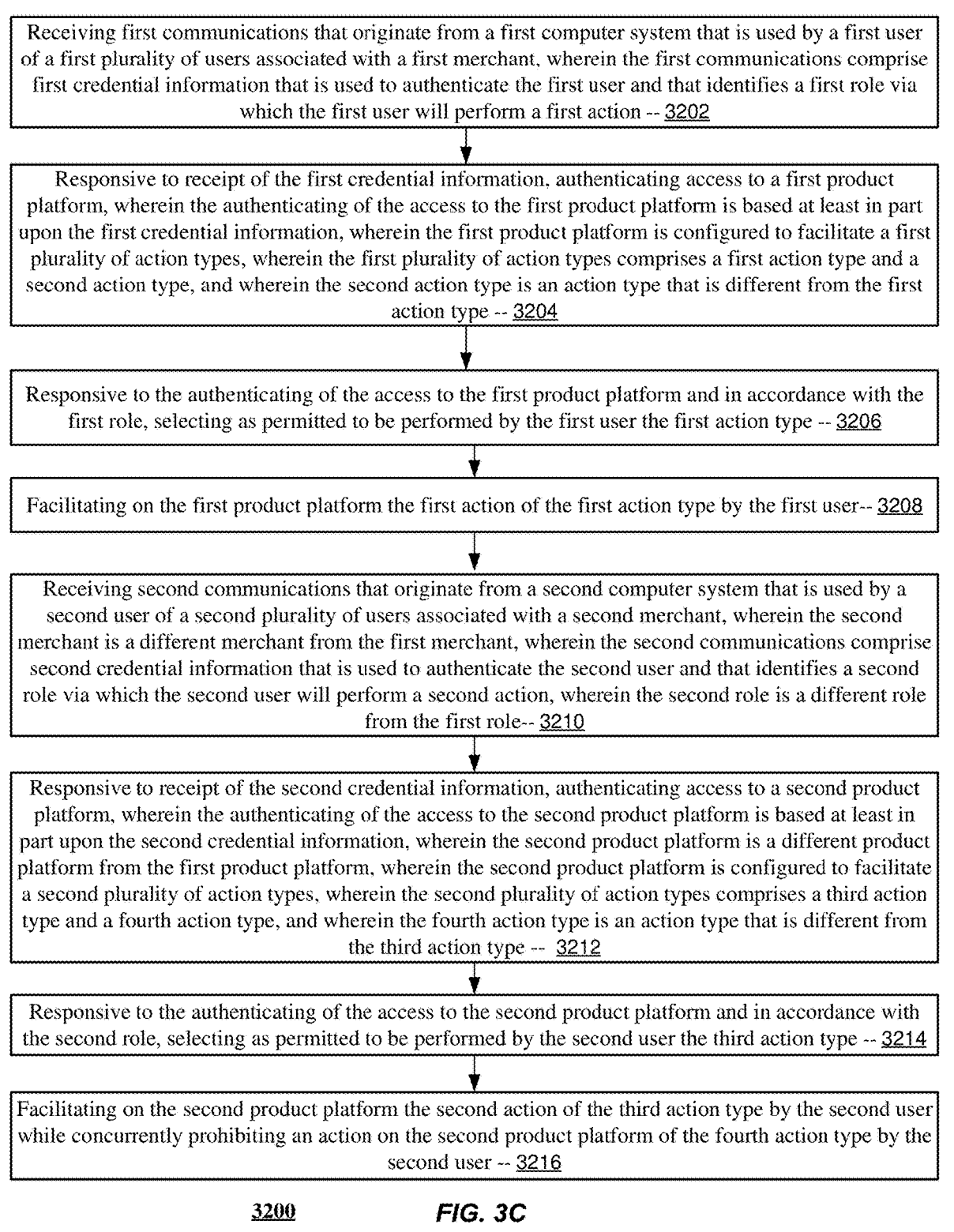

Receiving first communications that originate from a first computer system that is used by a first user of a first plurality of users associated with a first merchant, wherein the first communications comprise first credential information that is used to authenticate the first user and that identifies a first role via which the first user will perform a first action -- 3202

Responsive to receipt of the first credential information, authenticating access to a first product platform, wherein the authenticating of the access to the first product platform is based at least in part upon the first credential information, wherein the first product platform is configured to facilitate a first plurality of action types, wherein the first plurality of action types comprises a first action type and a second action type, and wherein the second action type is an action type that is different from the first action type -- 3204

Responsive to the authenticating of the access to the first product platform and in accordance with the first role, selecting as permitted to be performed by the first user the first action type -- 3206

Facilitating on the first product platform the first action of the first action type by the first user-- 3208

Receiving second communications that originate from a second computer system that is used by a second user of a second plurality of users associated with a second merchant, wherein the second merchant is a different merchant from the first merchant, wherein the second communications comprise second credential information that is used to authenticate the second user and that identifies a second role via which the second user will perform a second action, wherein the second role is a different role from the first role-- 3210

Responsive to receipt of the second credential information, authenticating access to a second product platform, wherein the authenticating of the access to the second product platform is based at least in part upon the second credential information, wherein the second product platform is a different product platform from the first product platform, wherein the second product platform is configured to facilitate a second plurality of action types, wherein the second plurality of action types comprises a third action type and a fourth action type, and wherein the fourth action type is an action type that is different from the third action type -- 3212

Responsive to the authenticating of the access to the second product platform and in accordance with the second role, selecting as permitted to be performed by the second user the third action type -- 3214

Facilitating on the second product platform the second action of the third action type by the second user while concurrently prohibiting an action on the second product platform of the fourth action type by the second user -- 3216

METHOD AND APPARATUS FOR USER AUTHENTICATION AND ACTION PROCESSING

FIELD OF THE DISCLOSURE

The subject disclosure relates to a method and an apparatus for user authentication and action processing.

BACKGROUND

FIG. 1A is a block diagram of a conventional portal landscape 1000. In this portal landscape 1000, an Enterprise and SMB (small and medium sized business) Direct Merchant experience typically involves distinct portals (wherein a merchant can have up to 2 separate credentials) leading to a fragmented experience. This portal landscape 1000 has certain limitations with respect to supporting merchants with a consistent and seamless experience, for example: (a) multiple entry points for SMB merchants based on platform, region; (b) certain inconsistent user experiences; (c) multiple access management solutions (complicating user and credential management); (d) certain redundant and duplicate capabilities/solutions; (e) certain digital support of United States use cases only; (f) multiple and disparate UX (user experience) frameworks; (g) certain platform/region based solutions that add implementation complexities and dependencies and introduces technical debt; and/or (h) complex to enable omni-channel experience.

FIG. 1B is a block diagram of a conventional portal landscape 1100. This portal landscape 1100 has certain limitations, for example: (a) multiple portal entry points for the client; (b) multiple and disparate entitlement stores for user access and entitlements (complicating user and credential management); (c) multiple and disparate UX frameworks; (d) certain redundant and duplicate feature/capability solutions; (e) multiple acquiring platforms across multiple datacenters, private and public clouds; and/or (f) certain duplicative functionality.

Still referring to FIG. 1B various ones of the above-mentioned limitations can lead to, for example: (a) fragmented and disjointed client experience; (b) double investment in certain merchant portal feature functionality (as it can require multiple solutions and delivery); (c) high levels of support for certain duplicative features; (d) certain operational risk and potential consistency of data issues with regards to transaction history, transaction management and reporting; (e) certain lack of product and feature parity across disparate solutions and experiences; and/or (f) inability to rapidly achieve time to market for feature availability.

Referring now once again to FIGS. 1A and 1B, in a certain merchant payment service, where there are a plurality of portals, a merchant user may need 2 (or more) different sets of login data (e.g., multiple sets of user authentication/authorization data) which are managed differently.

SUMMARY OF THE DISCLOSURE

One or more aspects of the subject disclosure include a device comprising: a processing system including a processor; and a memory that stores executable instructions that, when executed by the processing system, facilitate performance of operations, the operations comprising: receiving first communications that originate from a first computer used by a first user of a plurality of users associated with a merchant, wherein the first communications comprise first credential information that is used to authenticate the first user and that corresponds to a first role via which the first user will perform a first action; responsive to receipt of the first credential information, authenticating access to a product platform, wherein the authenticating of the access is based at least in part upon the first credential information, wherein the product platform is configured to facilitate a plurality of action types, wherein the plurality of action types comprises a first action type and a second action type, and wherein the second action type is an action type that is different from the first action type; responsive to the authenticating of the access to the product platform and in accordance with the first role, selecting as permitted to be performed by the first user the first action type; facilitating on the product platform the first action of the first action type by the first user while concurrently prohibiting an action on the product platform of the second action type by the first user; receiving second communications that originate from a second computer used by a second user of the plurality of users associated with the merchant, wherein the second communications comprise second credential information that is used to authenticate the second user and that corresponds to a second role via which the second user will perform a second action, wherein the second role is a different role from the first role; responsive to receipt of the second credential information, further authenticating access to the product platform, wherein the further authenticating of the access is based at least in part upon the second credential information; responsive to the further authenticating of the access to the product platform and in accordance with the second role, selecting as permitted to be performed by the second user the second action type; and facilitating on the product platform the second action of the second action type by the second user while concurrently prohibiting an action on the product platform of the first action type by the second user.

One or more aspects of the subject disclosure include a non-transitory machine-readable medium comprising executable instructions that, when executed by a processing system including a processor, facilitate performance of operations, the operations comprising: receiving at least one first communication that originates from a first computer system that is used by a first particular user of a first plurality of users associated with a first merchant, wherein the at least one first communication comprises first credential information that is used to authenticate the first particular user and that correlates to a first persona via which the first particular user will perform a first action; responsive to receipt of the first credential information, authenticating access to a product platform, wherein the authenticating of the access is based at least in part upon the first credential information, wherein the product platform is configured to facilitate a plurality of action types, wherein the plurality of action types comprises a first action type and a second action type, and wherein the second action type is an action type that is different from the first action type; responsive to the authenticating of the access to the product platform and in accordance with the first persona, selecting as permitted to be performed by the first particular user the first action type; facilitating on the product platform the first action of the first action type by the first particular user while concurrently prohibiting an action on the product platform of the second action type by the first particular user; receiving at least one second communication that originates from a second computer system that is used by a second particular user of a second plurality of users associated with a second merchant that is a different entity from the first merchant, and wherein the at least one second communication comprises second credential information that is used to authenticate the second particular user and that correlates to a second persona via which the second particular user will perform a second action; responsive to receipt of the second credential information, further authenticating access to the product platform, wherein the further authenticating of the access is based at least in part upon the second credential information; responsive to the further authenticating of the access to the product platform and in accordance with the second persona, selecting as permitted to be performed by the second particular user the second action type; and facilitating on the product platform the second action of the second action type by the second particular user while concurrently prohibiting an action on the product platform of the first action type by the second particular user.

One or more aspects of the subject disclosure include a method comprising: receiving, by a processing system including a processor, first communications that originate from a first computer system that is used by a first user of a first plurality of users associated with a first merchant, wherein the first communications comprise first credential information that is used to authenticate the first user and that identifies a first role via which the first user will perform a first action; responsive to receipt of the first credential information, authenticating, by the processing system, access to a first product platform, wherein the authenticating of the access to the first product platform is based at least in part upon the first credential information, wherein the first product platform is configured to facilitate a first plurality of action types, wherein the first plurality of action types comprises a first action type and a second action type, and wherein the second action type is an action type that is different from the first action type; responsive to the authenticating of the access to the first product platform and in accordance with the first role, selecting, by the processing system, as permitted to be performed by the first user the first action type; facilitating, by the processing system, on the first product platform the first action of the first action type by the first user while concurrently prohibiting an action on the first product platform of the second action type by the first user; receiving, by the processing system, second communications that originate from a second computer system that is used by a second user of a second plurality of users associated with a second merchant, wherein the second merchant is a different merchant from the first merchant, wherein the second communications comprise second credential information that is used to authenticate the second user and that identifies a second role via which the second user will perform a second action, wherein the second role is a different role from the first role; responsive to receipt of the second credential information, authenticating, by the processing system, access to a second product platform, wherein the authenticating of the access to the second product platform is based at least in part upon the second credential information, wherein the second product platform is a different product platform from the first product platform, wherein the second product platform is configured to facilitate a second plurality of action types, wherein the second plurality of action types comprises a third action type and a fourth action type, and wherein the fourth action type is an action type that is different from the third action type; responsive to the authenticating of the access to the second product platform and in accordance with the second role, selecting, by the processing system, as permitted to be performed by the second user the third action type; and facilitating, by the processing system, on the second product platform the second action of the third action type by the second user while concurrently prohibiting an action on the second product platform of the fourth action type by the second user.

In various embodiments, a product platform can comprise an infrastructure providing a user interface and group of software applications (sometimes referred to as “apps”).

BRIEF DESCRIPTION OF THE DRAWINGS

Reference will now be made to the accompanying drawings, which are not necessarily drawn to scale, and wherein:

FIG. 3A depicts an illustrative embodiment of a method in accordance with various aspects described herein.

FIG. 3B depicts an illustrative embodiment of a method in accordance with various aspects described herein.

FIG. 3C depicts an illustrative embodiment of a method in accordance with various aspects described herein.

DETAILED DESCRIPTION

The subject disclosure describes, among other things, illustrative embodiments for a unified merchant portal where merchants and other clients can access their transaction history, manage transaction state, manage their user access and permissions, and configure product settings.

Figure 2A:
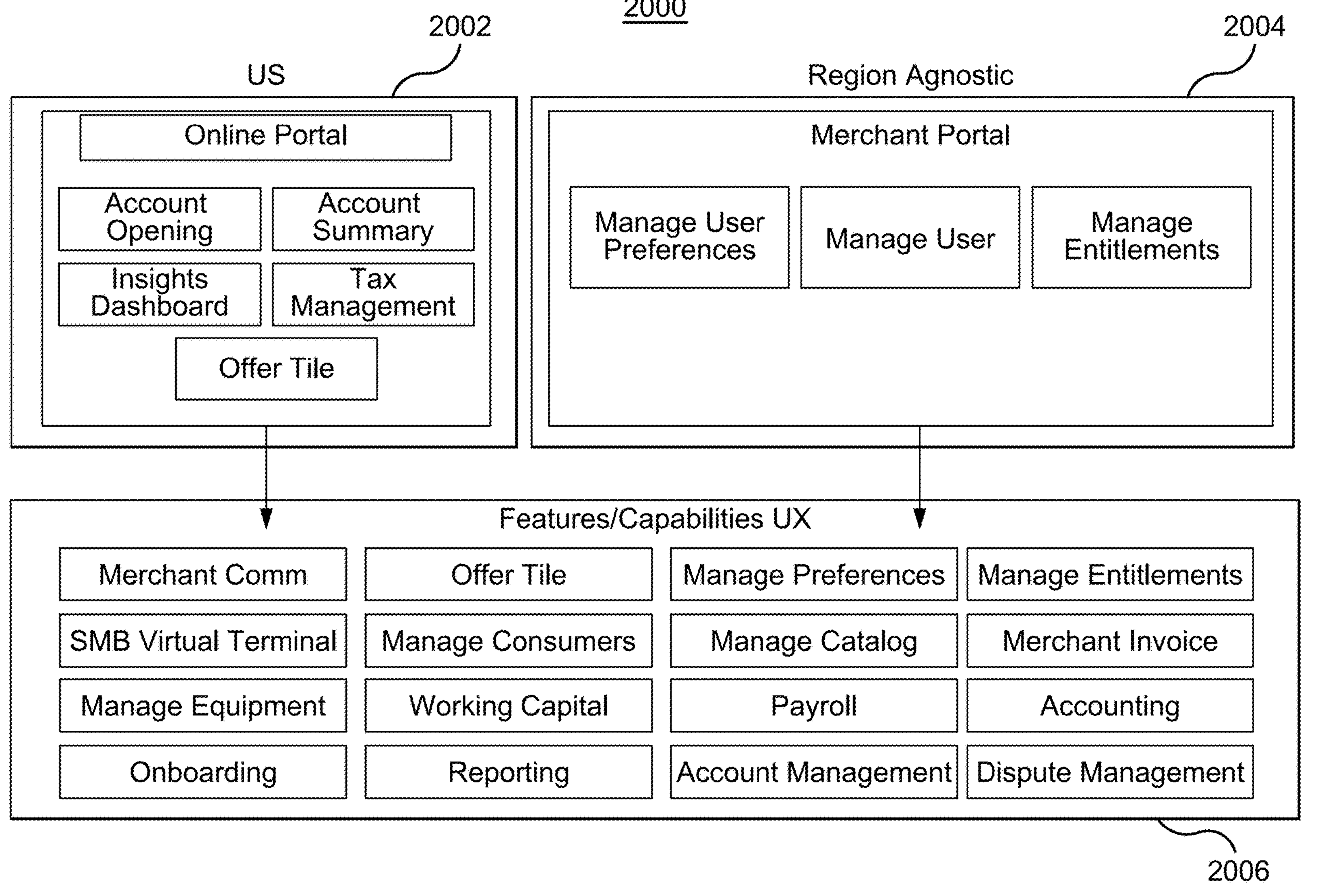
FIG. 2A is a block diagram illustrating an example, non-limiting embodiment of a system functioning in accordance with various aspects described herein.

Referring now to FIG. 2A, this is a block diagram illustrating an example, non-limiting embodiment of a system 2000 that can function in accordance with various aspects described herein. As seen in this figure, the system 2000 includes Online Portal 2002 (which is dedicated to US-based merchants) and Merchant Portal 2004 (which is region agnostic). The Online Portal 2002 can be configured to provide functionality for one or more of: (a) Account Opening; (b) Account Summary; (c) Insight Dashboard; (d) Tax Management; (e) Offer Tile; (f) any combination thereof. Merchant Portal 2004 can be configured to provide functionality for one or more of: (a) Manage User Preferences; (b) Manage User; (c) Manage Entitlements; (d) any combination thereof. In operation, users (e.g., employees, consultants, and/or independent contractors) associated with US-based merchants as well as users (e.g., employees, consultants, and/or independent contractors) associated with non-US-based merchants are permitted to log into Merchant Portal 2004. On the other hand, only users (e.g., employees, consultants, and/or independent contractors) associated with US-based merchants are permitted to log into Online Portal 2002. In either case (that is, logging into Merchant Portal 2004 or Online Portal 2002) the various users who are permitted to log in are provided with a set 2006 of features/capabilities for a user experience (UX). More particularly, such features/capabilities can include: Merchant Comm, Offer Tile, Manage Preferences, Manage Entitlements, SMB Virtual Terminal, Manage Customers, Manage Catalog, Merchant Invoice, Manage Equipment, Working Capital, Payroll, Accounting, Onboarding, Reporting, Account Management, and Dispute Management.

Still referring to FIG. 2A, various embodiments can enable seamless experiences for merchants (and/or their sub-users) who can access Merchant Portal 2004 for merchant specific capabilities directly (region agnostic) or logging in via Online Portal 2002 (for US-based merchants). In various embodiments, the Merchant Portal 2004 can comprise a new web-based external access channel, which allows access to merchant specific features/products, based on what access each logged-in user has. In various embodiments, a US-based SMB (small and medium sized business) merchant experience can include one or more of the following: (a) "As a merchant, I can continue to log into Online Portal using my Online Portal credentials and access merchant specific capabilities"; (b) "As a merchant, I can directly log into this new Merchant Portal using my Online Portal credentials"; (c) "As a merchant, I can get access to Merchant Portal using Online Portal entitlement management (ASM)"; (d) any combination thereof. In various embodiments, an all SMB merchant experience (that is region agnostic) can include one or more of the following: (a) "As a non-US merchant, I can directly log into this new Merchant Portal using my credentials (centralized user management solution)"; (b) "As a merchant, I can access specific new features/capabilities within Merchant Portal based on my role and access"; (c) "As a merchant, I can create sub-user(s) and manage their role(s) and access in Merchant Portal"; (d) any combination thereof.

Figure 2B:
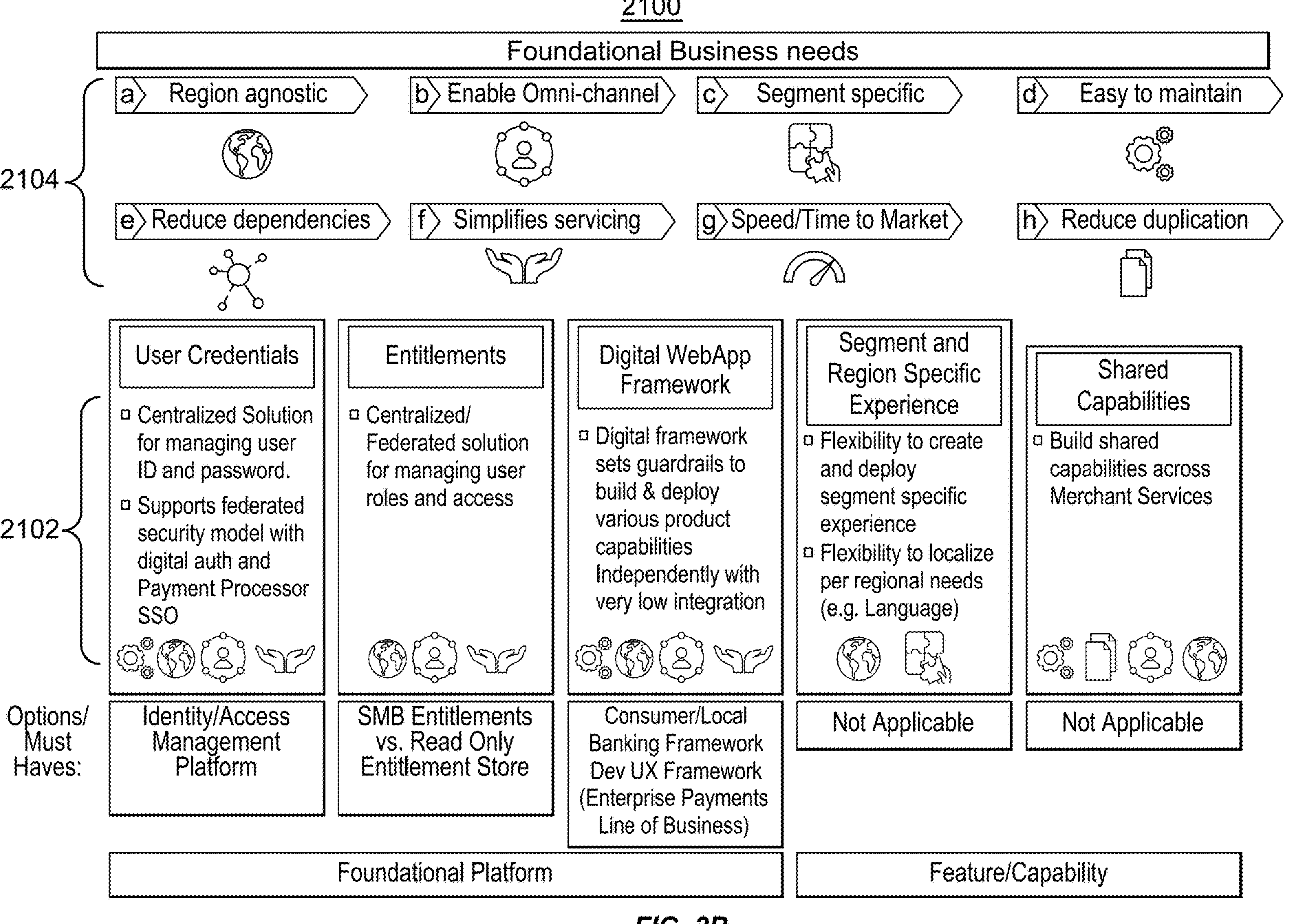
FIG. 2B is a block diagram illustrating an example, non-limiting embodiment of various building blocks functioning in accordance with various aspects described herein.

Referring now to FIG. 2B, this is a diagram 2100 illustrating an example, non-limiting embodiment of Building Blocks for a merchant portal functioning in accordance with various aspects described herein. The Building Blocks can facilitate merchant portal capabilities to enable seamless merchant experience across region and segment. More particularly, as seen in this figure, the Building Blocks 2102 can facilitate a number of Foundational Business Needs 2104. The Foundational Business Needs 2104 can include: (a) region agnostic; (b) enable omni-channel; (c) segment specific; (d) easy to maintain; (d) reduce dependencies; (f) simplifies servicing; (g) speed/time to market; (h) reduce duplication. The Building Blocks 2102 can include User Credentials, Entitlements, and Digital WebApp Framework (all part of a Foundational Platform). The Building Blocks 2102 can further include Segment and Region Specific Experience, and Shared Capabilities (all part of Feature/Capability). In operation, each of the Building Blocks 2102 can facilitate various ones of the Foundational Business Needs 2104 (as shown by the various corresponding icons). Further, as seen, the User Credentials can: (a) implement centralized solution for managing user ID and password; and (b) support federated security model with digital authentication and Payment Processor SSO (single sign on). Further still, the Entitlements can implement centralized/federated solution for managing user roles and access. Further still, the Digital WebApp Framework can implement digital framework that sets guardrails to build and deploy various product capabilities independently with very low integration. Further still, the Segment and Region Specific Experience can implement: (a) flexibility to create and deploy specific segment experience; and (b) flexibility to localize per regional needs (e.g., language). Further still, the Shared Capabilities can implement building of shared capabilities across merchant services. In various embodiments, one or more of the Building Blocks 2102 can implement a federated security model (e.g., which allows each user to use a single set of user credentials (ID and password) across various identity systems).

Figure 2C:
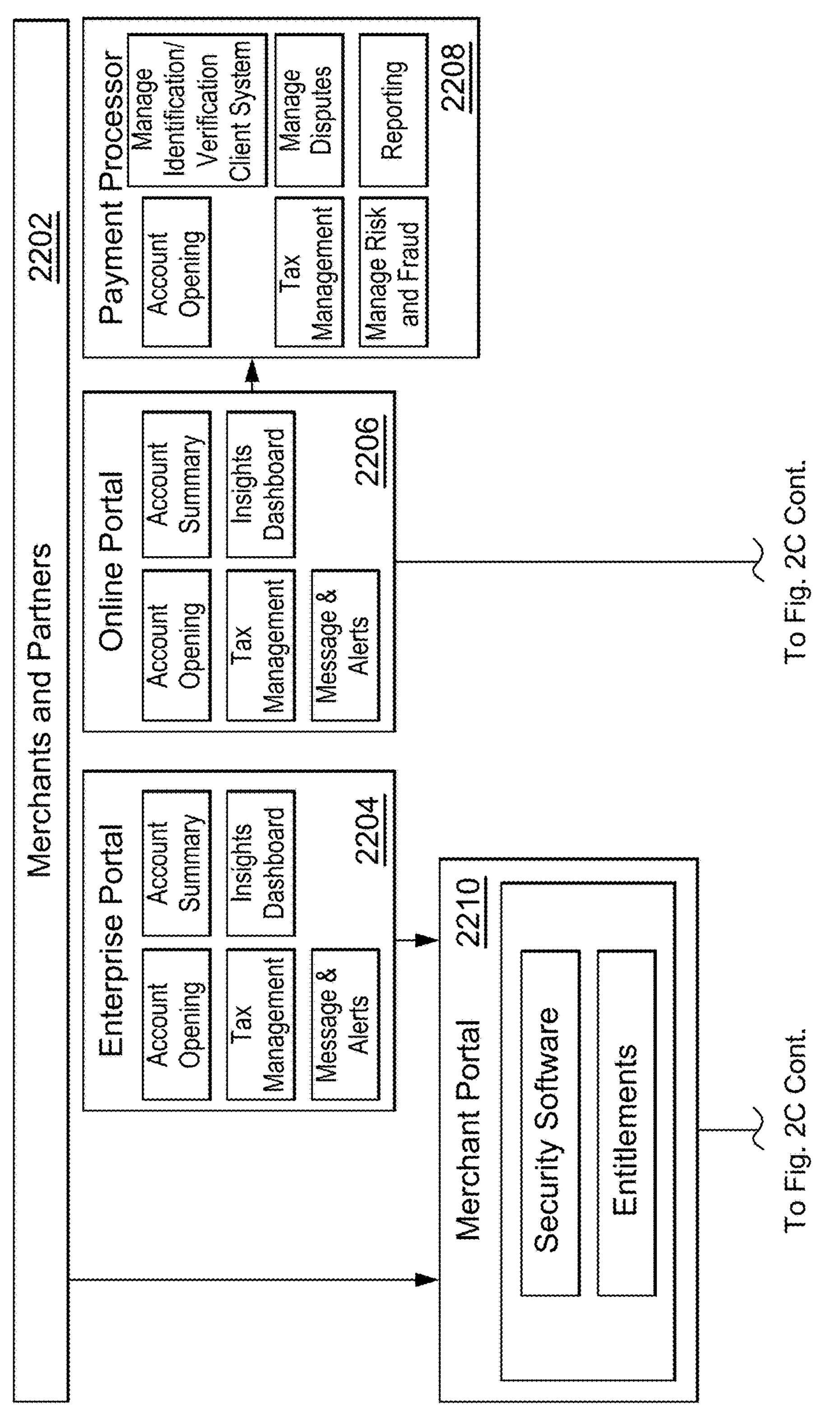
FIG. 2C is a block diagram illustrating an example, non-limiting embodiment of a system functioning in accordance with various aspects described herein.
Figure 2C:
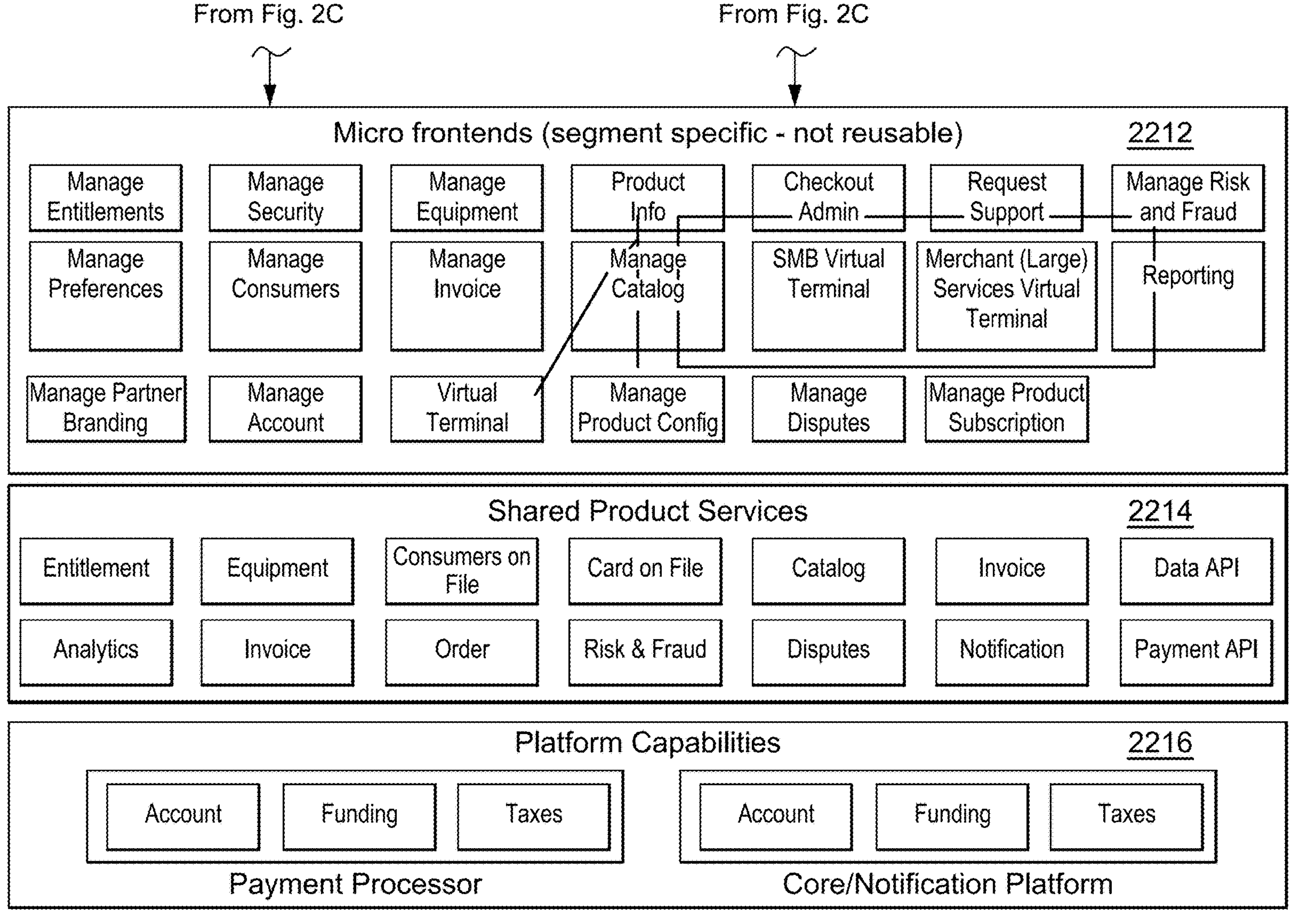

Referring now to FIG. 2C, this is a block diagram illustrating an example, non-limiting embodiment of a system 2200 that can function in accordance with various aspects described herein. As seen in this figure, the system 2200 includes Enterprise Portal 2204, Online Portal 2206, Payment Processor 2208, Merchant Portal 2210, Micro Frontends 2212, Shared Product Services 2214, and Platform Capabilities 2216. In operation, one option is for Merchants and Partners 2202 to log directly into Merchant Portal 2210, which then provides access to Micro Frontends 2212 (as well as Shared Product Services 2214, and Platform Capabilities 2216). A second option is for Merchants and Partners 2202 to log directly into Enterprise Portal 2204, which in turn then provides access to Merchant Portal 2210, which then provides access to Micro Frontends 2212 (as well as Shared Product Services 2214, and Platform Capabilities 2216). A third option is for Merchants and Partners 2202 to log directly into Online Portal 2206, which then provides access to Micro Frontends 2212 (as well as Shared Product Services 2214, and Platform Capabilities 2216). Under this third option, Online Portal 2206 provides access to Payment Processor 2208. In various embodiments, the Merchant Portal 2210 can comprise a new web-based external access channel which allows access to merchant specific features/products, based on what access each logged-in user has.

Still referring to FIG. 2C, various embodiments can enable new features/capabilities that are built independently and that can be accessed from various channels (such as Online/Merchant Portal). In various embodiments, the system 2200 can provide one or more of: (a) leveraging by merchants of firm-wide entry points (e.g., Enterprise Portal, Online Portal, Merchant Portal) based on market segments for basic/foundational functionality; (b) direct access by global SMB/non-SMB merchants to Merchant Portal in regions where firm wide entry is not strategic; (c) shared framework across merchant services with federated security model, entitlements, styling; (d) servicing of non-SMB needs and/or global SMB needs; (e) building & deploying independently with low integration to merchant portal; (f) flexibility to create and deploy specific UX experience per market segment/channels (e.g., leveraging shared framework); (g) build shared product capabilities across merchant services; (h) utilize disparate platform capabilities across segments to manage account and funding; (i) facilitate speed to market (e.g., build shared capabilities as services and reuse across merchant services); (j) facilitate flexibility across market segment (e.g., allows flexibility for each market segment/region/channel to own the UX experience); (k) manage the delivery of various merchant specific use cases without reliance on co-suppliers; (l) flexibility to implement regional strategy; (m) permitting platform capabilities (such as managing accounts, funding) to continue segment aligned; and/or (n) permit each market segment to have the flexibility to create and deploy UX experiences.

Figure 2D:
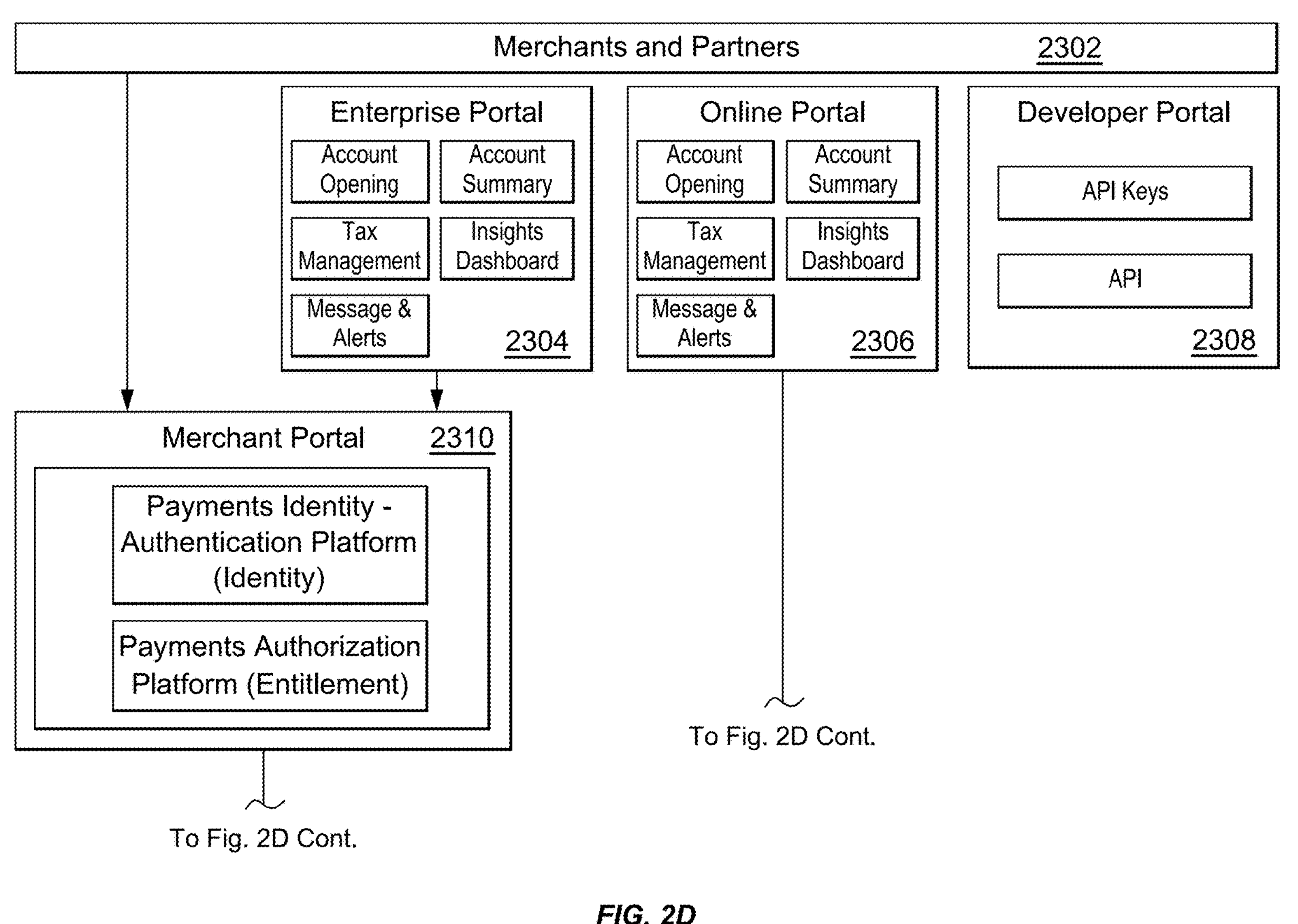
FIG. 2D is a block diagram illustrating an example, non-limiting embodiment of a system functioning in accordance with various aspects described herein.
Figure 2D:
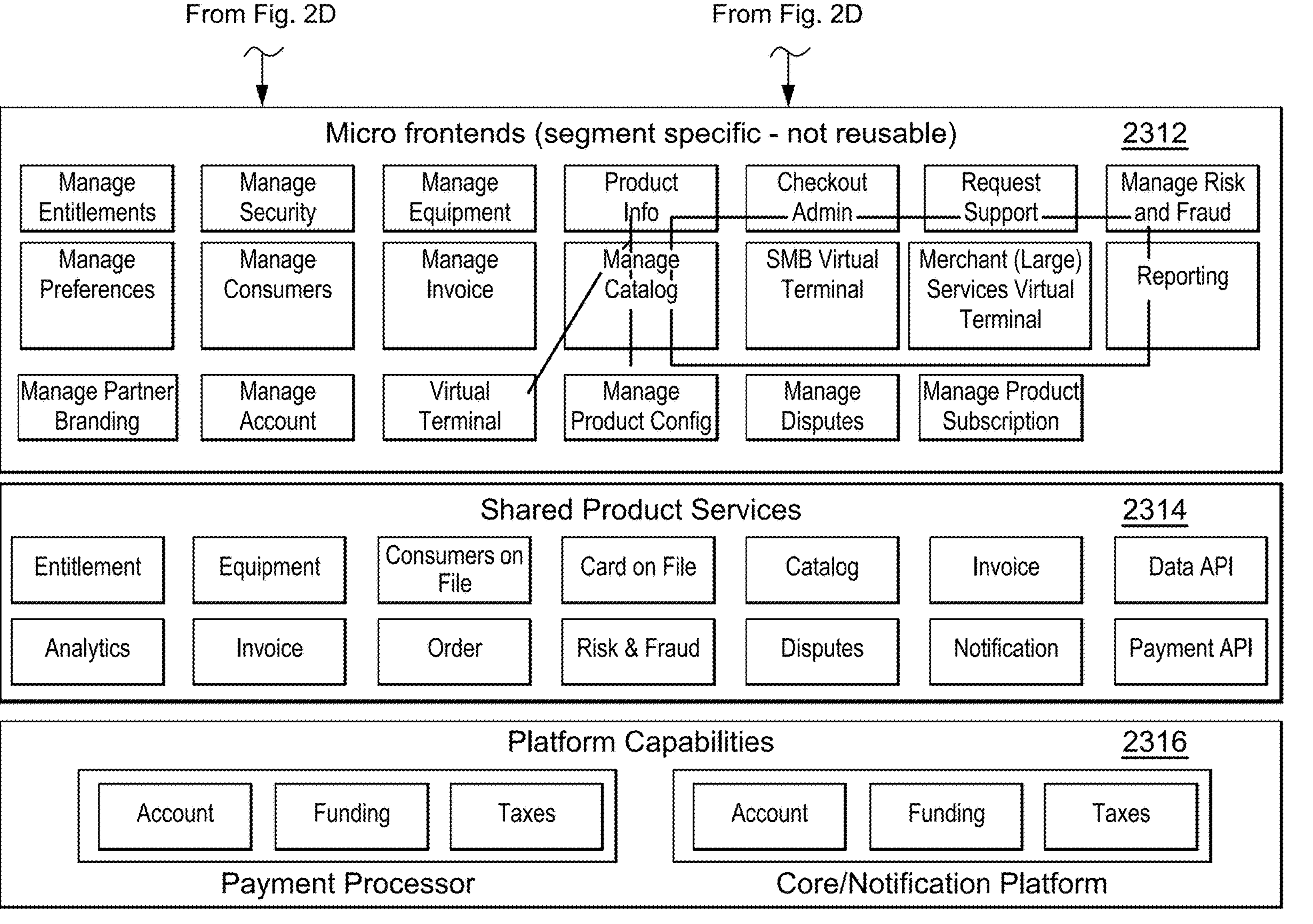

Referring now to FIG. 2D, this is a block diagram illustrating an example, non-limiting embodiment of a system 2300 that can function in accordance with various aspects described herein. As seen in this figure, the system 2300 includes Enterprise Portal 2304, Online Portal 2306, Developer Portal 2308, Merchant Portal 2310, Micro Frontends 2312, Shared Product Services 2314, and Platform Capabilities 2316. In operation, this system 2300 works in a manner similar to system 2200 of FIG. 2C. The main differences are as follows: (a) in system 2300 a Developer Portal 2308 is implemented (in place of Payment Processor 2208); and (b) Merchant Portal 2310 includes the indicated functionality (in place of the functionality of Merchant Portal 2210).

Figure 2E:
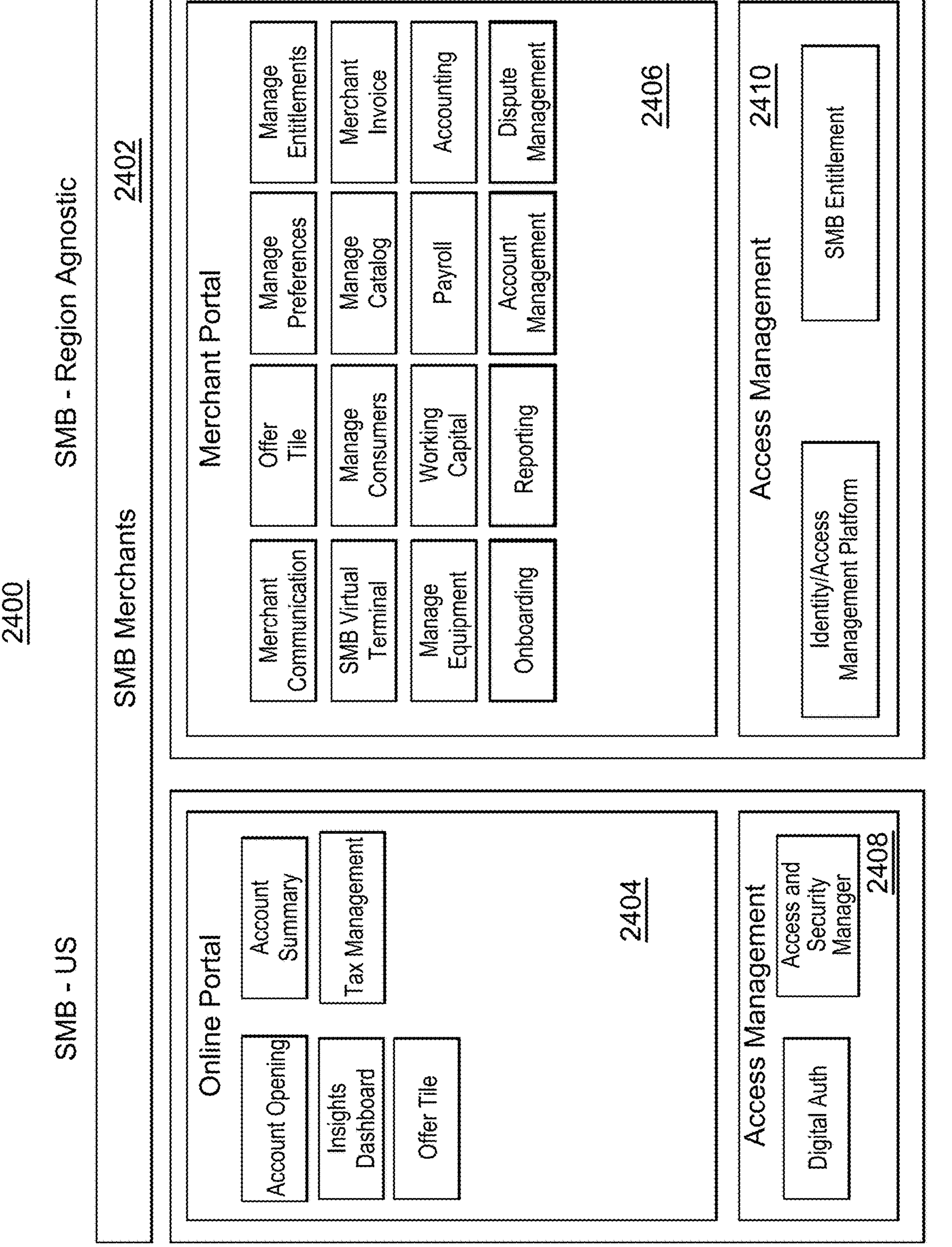
FIG. 2E is a block diagram illustrating an example, non-limiting embodiment of a system functioning in accordance with various aspects described herein.
Figure 2E:
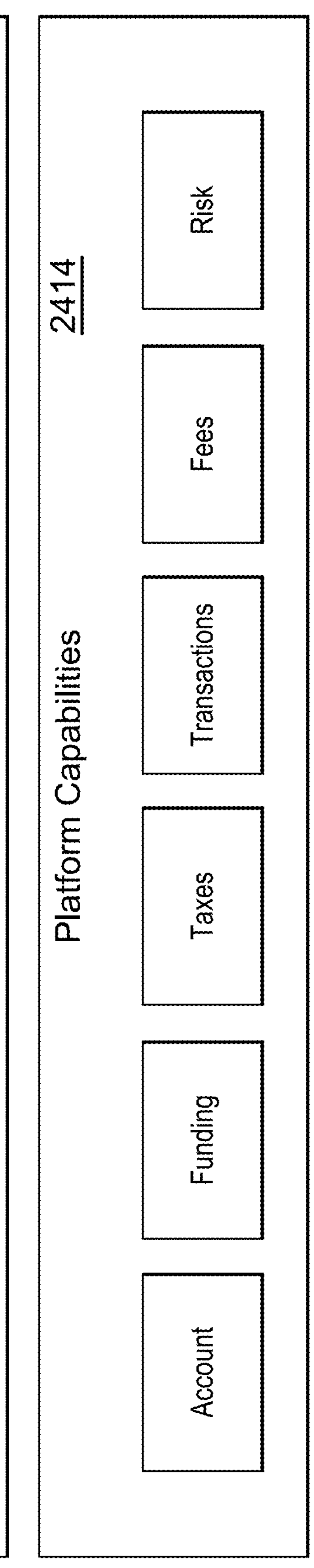

Referring now to FIG. 2E, this is a block diagram illustrating an example, non-limiting embodiment of a system 2400 that can function in accordance with various aspects described herein. As seen in this figure, the system 2400 includes Online Portal 2404, Merchant Portal 2406, Access Management 2408, Access Management 2410, Shared Product Services 2412, and Platform Capabilities 2414. In operation, in one option, certain ones of SMB Merchants 2402 can log into Online Portal 2404 (which provides Access Management 2408). In another option, certain ones of SMB Merchants 2402 can log into Merchant Portal 2406 (which provides Access Management 2410). In either case, the SMB Merchants 2402 can be provided with Shared Product Services 2412 and Platform Capabilities 2414. In various embodiments, the Merchant Portal 2406 can comprise a new web-based external access channel, which allows access to merchant specific features/products, based on what access each logged-in user has.

Still referring to FIG. 2E, various embodiments can enable new features/capabilities that are built independently and that can be accessed from various channels (such as Online Portal/Merchant Portal). In various embodiments, the system 2400 can provide one or more of: (a) leveraging benefits of Payment Processor capabilities, Consumer/Local Banking digital, Digital and Platform Services payments, and Global Solution for the Merchant Portal; (b) leveraging by SMB US Merchants of firm-wide entry point wherever available; (c) direct access by SMB Merchants to the Merchant Portal (or will be redirected from firm wide portal for merchant specific needs); (d) each capability within Merchant Portal can be built and deployed independently with low integration; (e) extend existing merchant center capabilities in the new Merchant Portal (similar to partner integration); (f) utilize a federated security model (which will centralize user access management); (g) building & deploying end-to-end feature/functionality independently with low integration; (h) better maintainability; (i) simplified user access management; (j) speed to market (e.g., build shared capabilities across regions for SMB); (k) reduce dependencies (e.g., manage the delivery of the SMB specific use cases with low dependencies); (l) decommissioning of legacy portals; (m) leveraging by SMB of Consumer/Local Banking framework for building micro-frontend; (n) each micro-frontend can be protected by Identity/Access Management Platform; (o) an Identity/Access Management Platform can support federated security model with Payment Processor SSO and Digital Auth for a consistent merchant experience; (p) use SMB entitlements for fine grain entitlements across all SMB merchants; (q) sync SMB Entitlements with Digital Access and Security Manager (ASM); (r) utilize Identity/Access Management Platform as solution for identity provider support for SMB use cases; and/or(s) implement a data API for reporting, servicing, VAS and analytics SMB use cases.

Figure 2F:
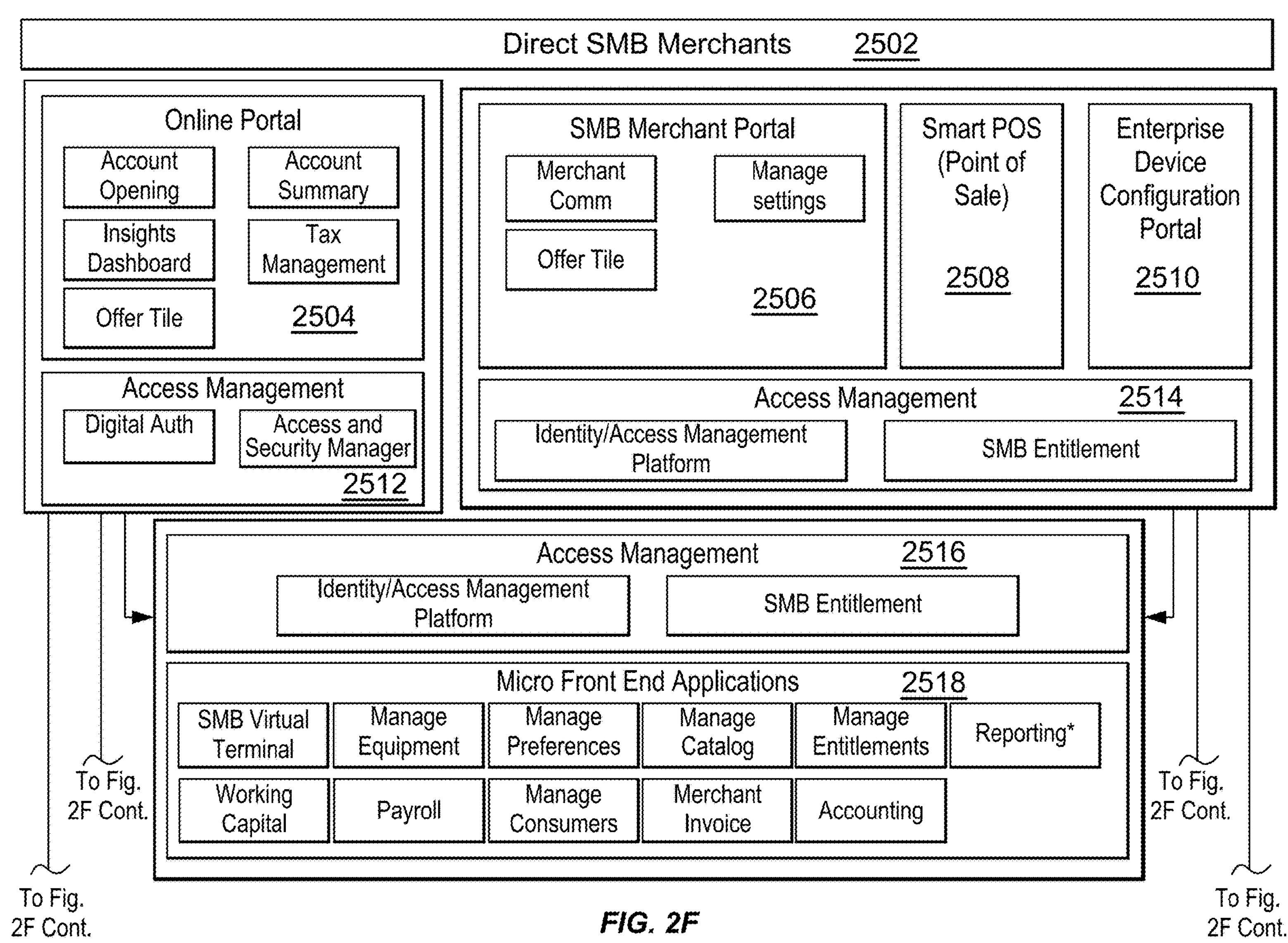
FIG. 2F is a block diagram illustrating an example, non-limiting embodiment of a system functioning in accordance with various aspects described herein.
Figure 2F:
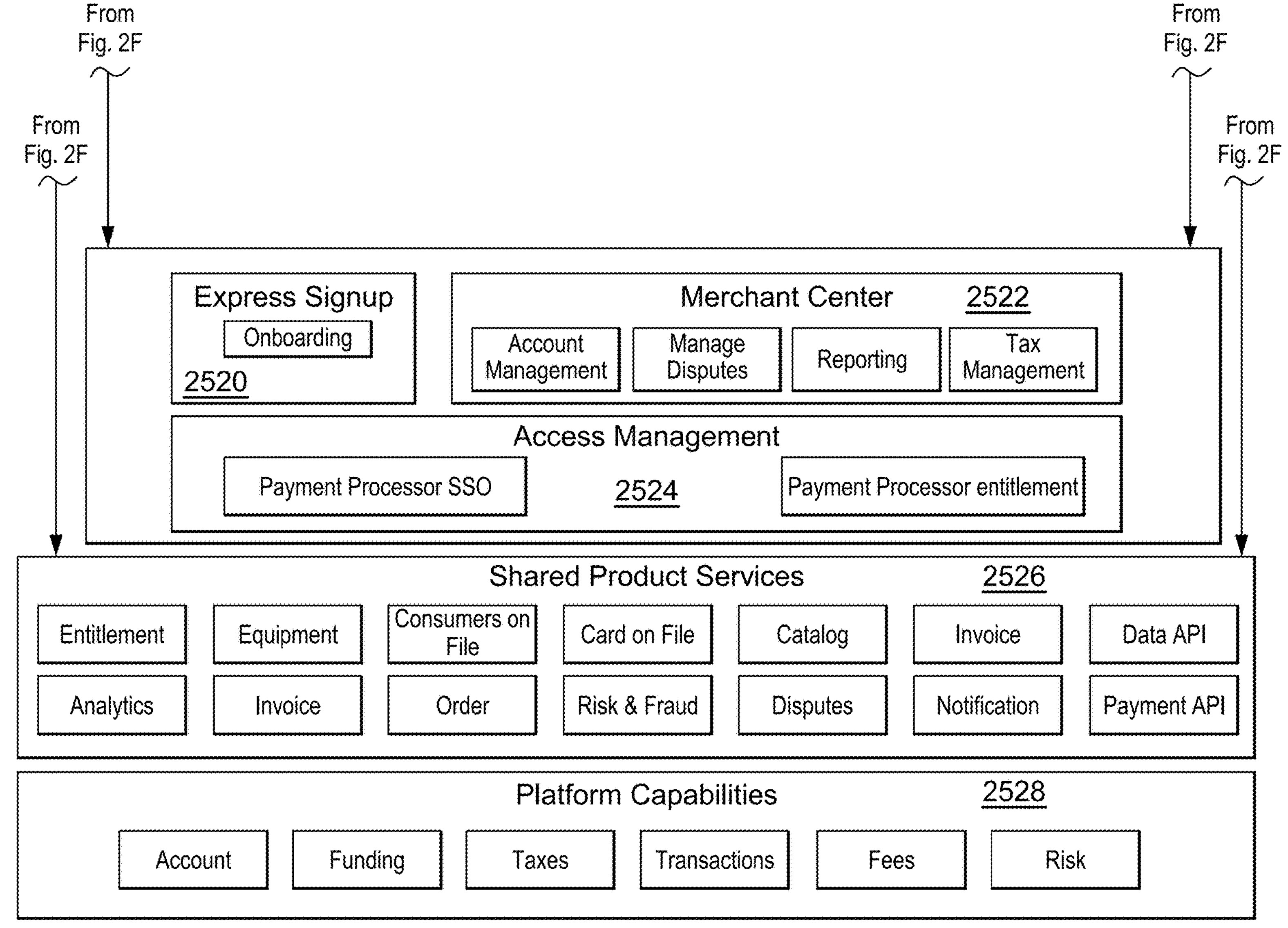

Referring now to FIG. 2F, this is a block diagram illustrating an example, non-limiting embodiment of a system 2500 that can function in accordance with various aspects described herein. As seen in this figure, the system 2500 includes Online Portal 2504, SMB Merchant Portal 2506, Smart POS (Point of Sale) 2508, Enterprise Device Configuration Portal 2510, Access Management 2512, Access Management 2514, Access Management 2516, Micro Front End Applications (MFEs) 2518, Express Signup 2520, Merchant Center 2522, Access Management 2524, Shared Product Services 2526, and Platform Capabilities 2528. In operation, in one option, certain ones of SMB Merchants 2502 can log into Online Portal 2504 (which provides Access Management 2512). In another option, certain ones of SMB Merchants 2502 can log into SMB Merchant Portal 2506/Smart POS (Point of Sale) 2508/Enterprise Device Configuration Portal 2510 (which provide Access Management 2514). In either case, the SMB Merchants 2502 can be provided with Access Management 2516, MFEs 2518, Express Signup 2520, Merchant Center 2522, Access Management 2524, Shared Product Services 2526, and Platform Capabilities 2528. In various embodiments, the SMB Merchant Portal 2506 can comprise a new web-based external access channel which allows access to merchant specific features/products, based on what access each logged-in user has.

Still referring to FIG. 2F, various embodiments can enable a desired SMB portal and external access channel strategy. In various embodiments, the system 2500 can provide one or more of: (a) leveraging by SMB merchants of firm-wide entry point wherever available; (b) direct access by SMB Merchants to the Merchant Portal (or will be redirected from firm wide portal for merchant specific needs); (c) leveraging by SMB of Consumer/Local Banking framework for building micro-frontend; (d) each micro-frontend can be protected by Identity/Access Management Platform; (e) an Identity/Access Management Platform can support federated security model with Payment Processor SSO and Digital Auth for a consistent merchant experience; (f) use SMB entitlements for fine grain entitlements across all SMB merchants; (g) sync SMB Entitlements with Digital Access and Security Manager (ASM); (h) merchant center can continue to support onboarding experience; (i) merchant center can continue to support certain account management, dispute management and reporting capabilities; (j) building of shared product capabilities (which can be API enabled and segment agnostic); (k) continued leveraging of foundational capabilities on Payment Processor/SMB platform; (l) speed to market (e.g., build shared capabilities and UX across regions for SMB); (m) reduce dependencies (e.g., manage the delivery of the SMB specific use cases without reliance on co-suppliers; (n) building & deploying end-to-end feature/functionality independently with low integration; (o) support decommissioning legacy portal(s); (p) utilize Identity/Access Management Platform as solution for identity provider support for SMB use cases; and/or (q) implement a data API for reporting, servicing, VAS and analytics SMB use cases.

Figure 2G:
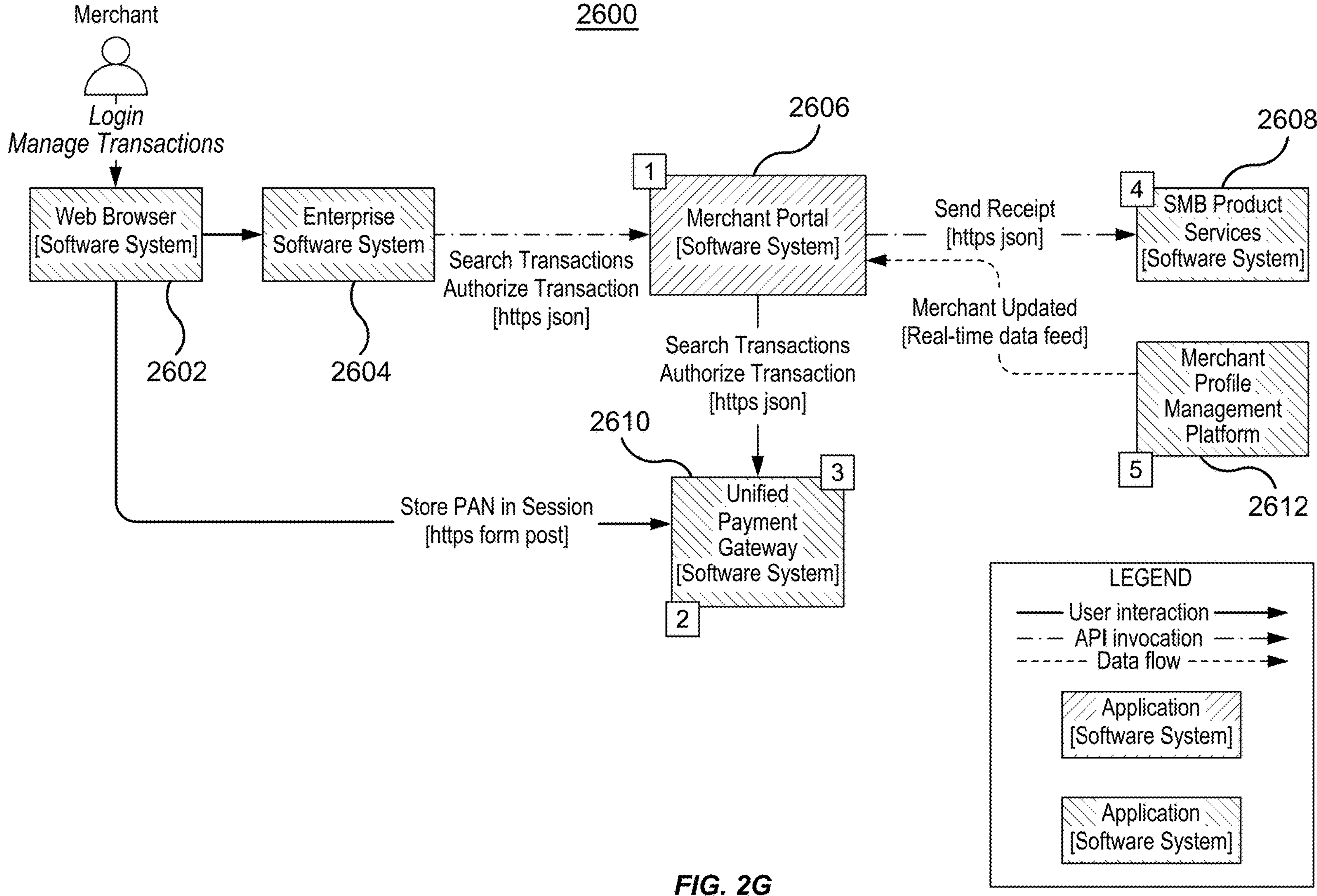
FIG. 2G is a block diagram illustrating an example, non-limiting embodiment of a system functioning in accordance with various aspects described herein.

Referring now to FIG. 2G, this is a block diagram illustrating an example, non-limiting embodiment of a system 2600 that can function in accordance with various aspects described herein (this diagram depicts certain aspects of a process flow from the client perspective, and incorporates an abstract ecosystem of tools, technologies, and applications). The system 2600 can include Web Browser 2602, Enterprise Software System 2604, Merchant Portal 2606, SMB Product Services 2608, Unified Payment Gateway (UPG) 2610, and Merchant Profile Management Platform (MPS) 2612, As seen in this figure (which provides a system context), the system 2600 facilitates interaction with users and components (the interaction incorporating the responsibility and ownership of those components (new and existing)). In operation, the system can facilitate the following functions: 1) Merchant logs into the Merchant Portal 2606 using Enterprise Software System 2604, where they can manage transactions and process a new transaction; 2) Web Browser 2602 calls Unified Payment Gateway 2610 to obtain IFRAM hosted card data fields and submits the PAN data to the server to eliminate PAN data flowing through Enterprise Software System 2604; 3) Merchant invokes Unified Payment Gateway 2610 API through Payments Portal (MPP) to process authorizations with the provided session id, lookup transactions and issue refund or void them; 4) Merchant sends receipts through SMB Product Services receipt service; 5) Merchant profile updates are streamed to the Merchant Portal 2606 via a real-time data feed.

Figure 2H:
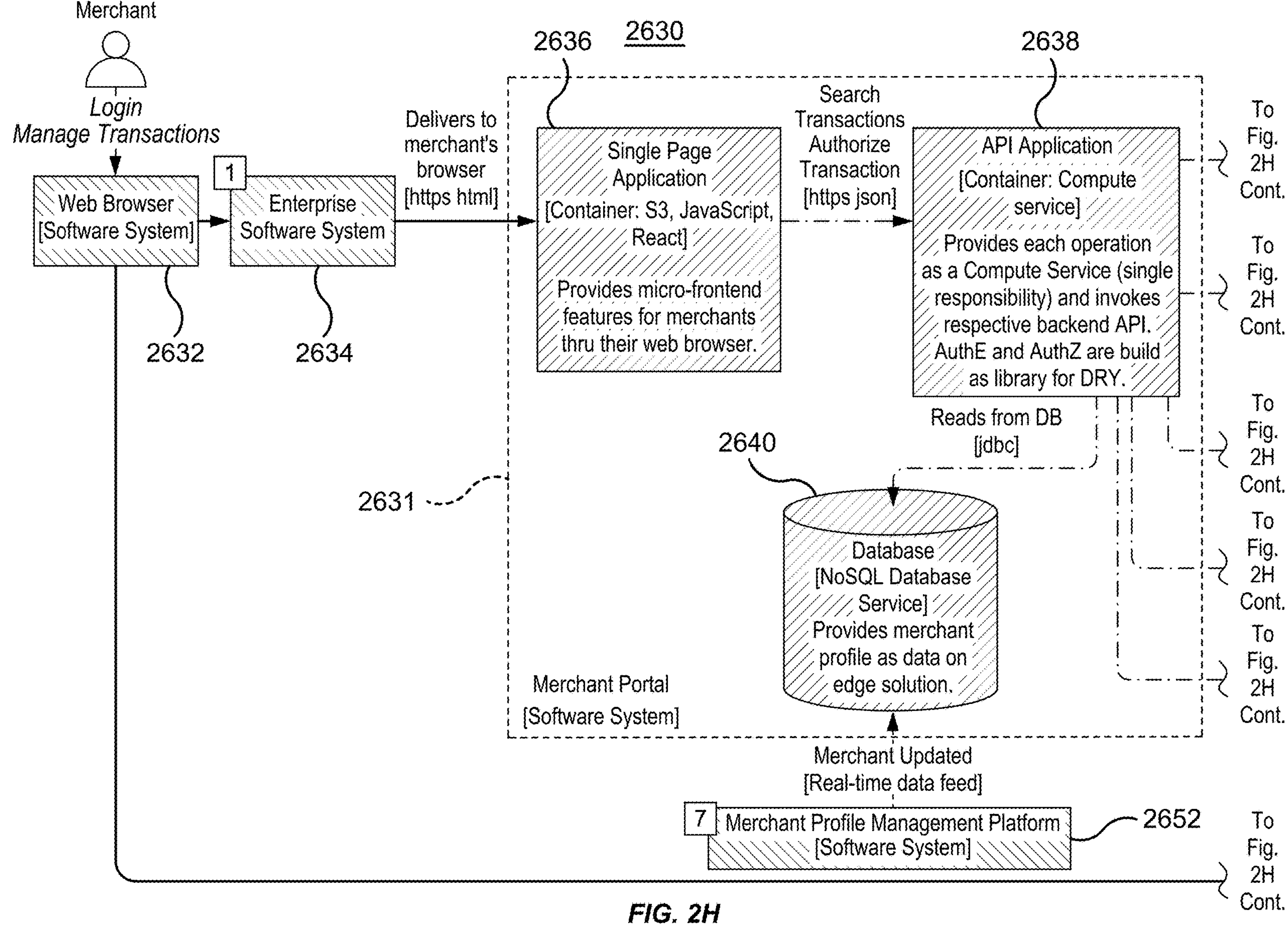
FIG. 2H is a block diagram illustrating an example, non-limiting embodiment of a system functioning in accordance with various aspects described herein.
Figure 2H:
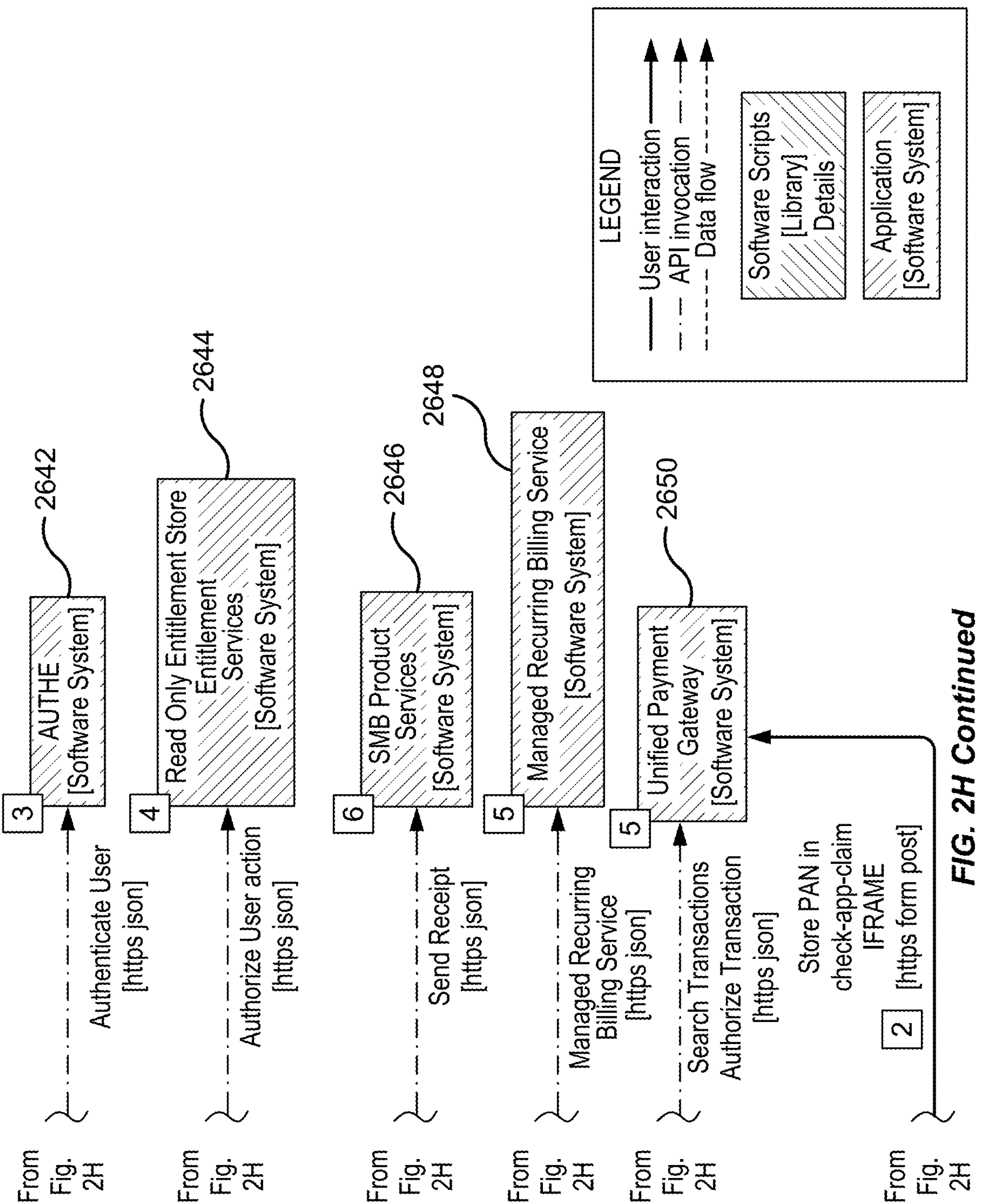

Referring now to FIG. 2H, this is a block diagram illustrating an example, non-limiting embodiment of a system 2630 that can function in accordance with various aspects described herein (this diagram depicts certain aspects of the technology selections, patterns, and inter-component interactions). The system 2630 can include Web Browser 2632, Enterprise Software System 2634, Single Page Application 2636, API Application 2638, Database 2640, AuthE 2642, Read Only Entitlement Store (ROES) Entitlement Services 2644, SBM Product Services 2646, Managed Recurring Billing Service (MRPS) 2648, Unified Payment Gateway (UPG) 2650, and Merchant Profile Management Platform (MPS) 2652. As seen in this figure (which provides a container diagram), the system 2630 facilitates interaction with users and components. In operation, the system can facilitate the following functions: 1) Merchant logs into the Merchant Portal 2631 using Enterprise Software System 2634, where they can manage transactions and process new transaction; 2) Web Browser 2632 calls the Unified Payment Gateway 2650 to obtain IFRAM hosted card data fields and submits the PAN data to the server to eliminate PAN data flowing through Enterprise Software System 2634; 3) Every API invocation will validate user token through AUTHE 2642; 4) Every API invocation will validate user entitlement before performing the operation; 5) Merchant invokes Unified Payment Gateway 2650 API through MPP to process authorizations with the provided session id, lookup transactions and issue refund or void them; 6) Merchant sends receipts through SMB Product Services 2646 receipt service; 7) Merchant profile updates are streamed to the Merchant Portal 2631 via a real-time data feed.

Figure 2I:
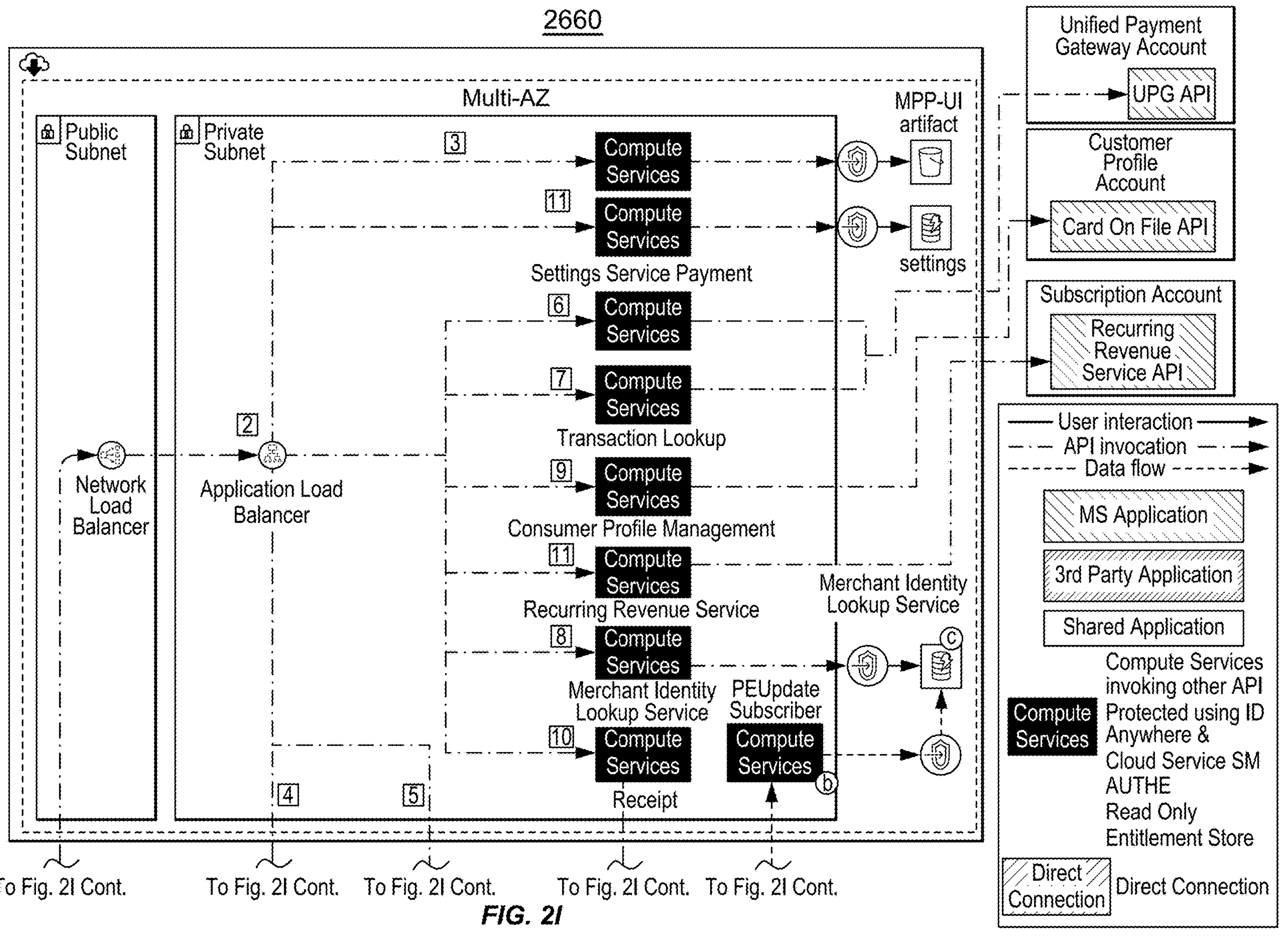
FIG. 2I is a block diagram illustrating an example, non-limiting embodiment of a system functioning in accordance with various aspects described herein.
Figure 2I:
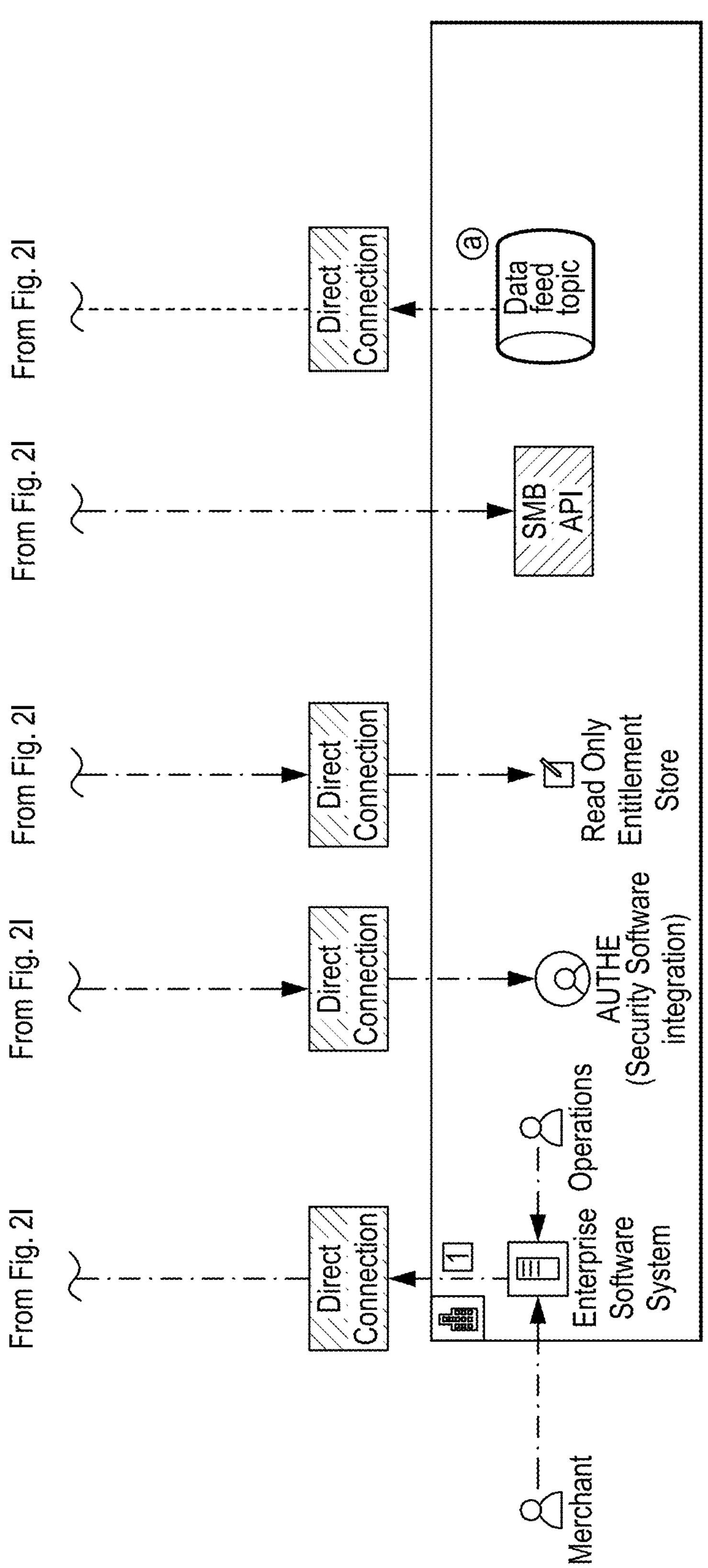

Referring now to FIG. 2I, this is a block diagram illustrating an example, non-limiting embodiment of a system 2660 that can function in accordance with various aspects described herein (this diagram depicts certain aspects of the deployed application components view within the infrastructure across multiple datacenters or globally). More particularly, as seen in this figure (which provides a deployment diagram), the system 2660 facilitates interaction with users and components.

Still referring to FIG. 2I, in operation, the system can facilitate the following functions associated with MPP Application Flow. More particularly (see call out number 1), the Enterprise Software System has successfully authenticated the client. AuthE JWT token will be generated and passed on to a cloud service. In order to paint (e.g., generate, adjust, configure, or otherwise provide) the UI, the request is routed to MPP thru DNS. Next (see call out number 2) a user request is routed to load balancers-Network Load Balancer (NLB) (layer 4) and Application Load Balancer (ALB) (layer 7). Next (see call out number 3) UI contents is retrieved from s3 bucket using compute services. Subsequent user activity will trigger the next action. Next (see call out number 4) the user authentication token is validated on every HTTP request. Next (see call out number 5) User authorization/entitlement is validated on every HTTP request. If valid, merchant profile is validated/looked up using the mid-lookup (Merchant Identity Lookup Service) table before performing the user requested action. Next (see call out number 6) when a particular action is performed by the user, a corresponding action will be performed. For example (see call out number 7) when a client needs to look up a transaction, steps 1 thru 3 will be followed and “Transaction search” compute service will take over the action based on the URI path. Next (see call out number 8) look up mid from compute service, make call to ROES service, get all entitled MIDs for the user. Based on the MIDs, lookup dynamo and provide all MIDs with different MOB—payment and currency available. Next (see call out number 9) ability to manage customer profile through MPP. Managing customer card details can require a PCI.

Still referring to FIG. 2I, a merchant profile event consumer process can proceed as follows. First (see call out letter a), when a new client (merchant) is onboarded or updated, real-time data feed topic will receive an event. Next (see call out letter b), a compute service gets triggered based on the previous event. Next (see call out letter c), a table will be updated with the merchant profile information.

Figure 2J:
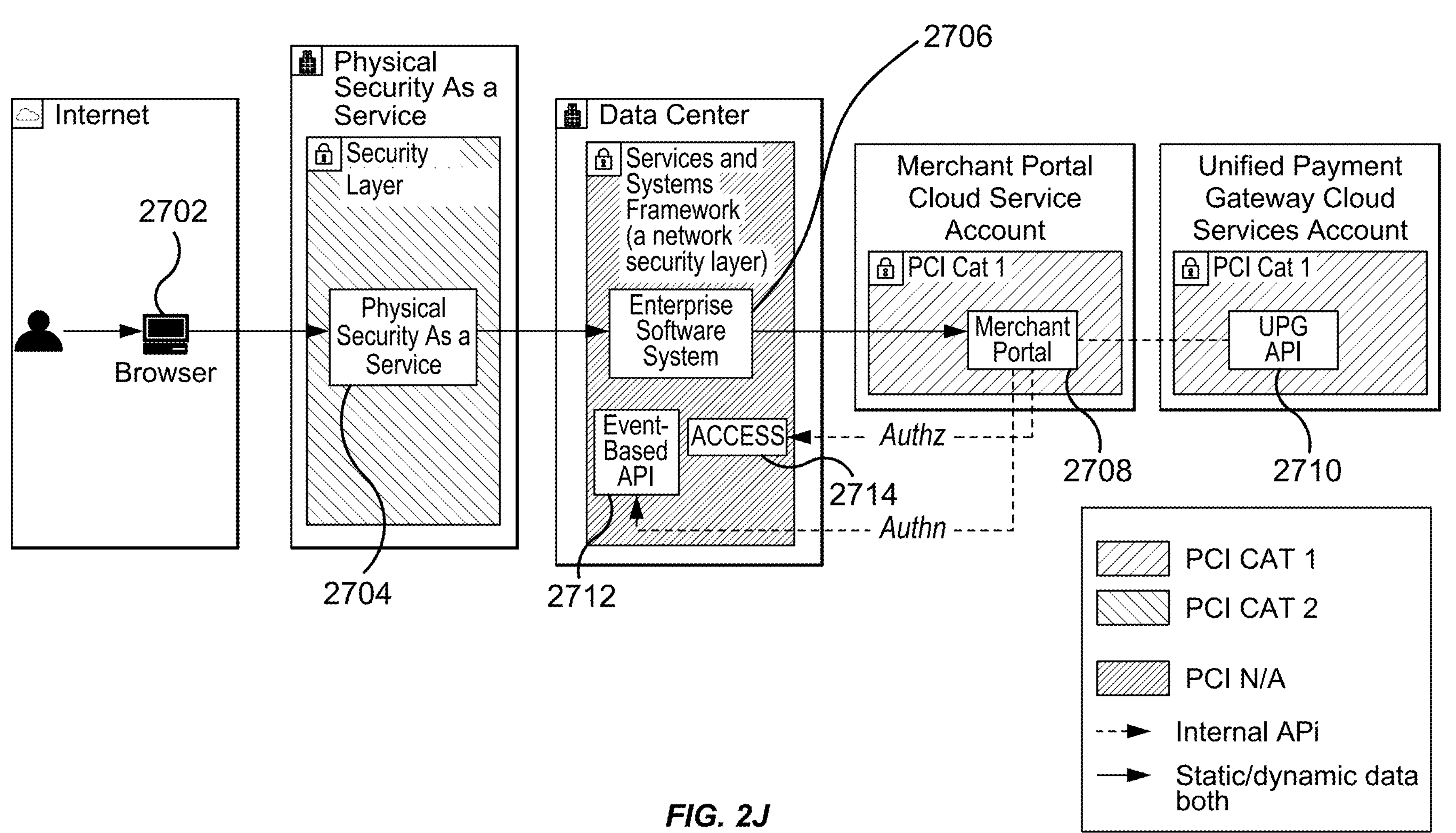
FIG. 2J is a block diagram illustrating an example, non-limiting embodiment of a system functioning in accordance with various aspects described herein.

Referring now to FIG. 2J, this is a block diagram illustrating an example, non-limiting embodiment of a system 2700 that can function in accordance with various aspects described herein (this diagram depicts certain aspects of PCI scoping options). As seen in this figure, a Browser 2702

(being operated by a user) is configured for communications with Physical Security As A Service (PSAAS) 2704, which is configured for communications with Enterprise Software System 2706, which is configured for communications with Merchant Portal 2708, which is configured for communications with Unified Payment Gateway API 2710. Further, Merchant Portal 2708 is configured for communications with Event-based API 2712 and Access 2714.

Figure 2K:
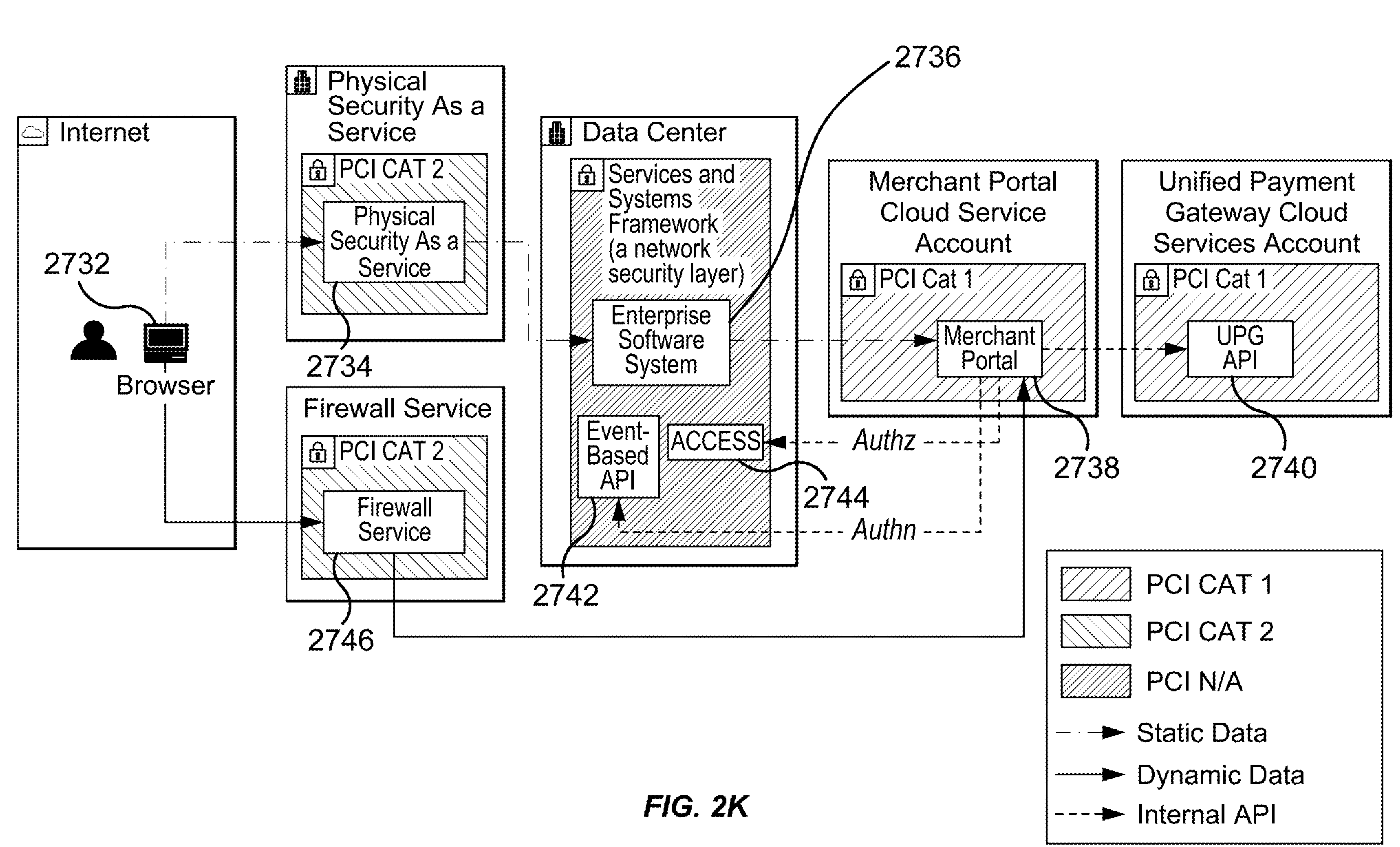
FIG. 2K is a block diagram illustrating an example, non-limiting embodiment of a system functioning in accordance with various aspects described herein.

Referring now to FIG. 2K, this is a block diagram illustrating an example, non-limiting embodiment of a system 2730 that can function in accordance with various aspects described herein (this diagram depicts certain aspects of PCI scoping options). As seen in this figure, a Browser 2732 (being operated by a user) is configured for communications with Physical Security As A Service (PSAAS) 2734, which is configured for communications with Enterprise Software System 2736, which is configured for communications with Merchant Portal 2738, which is configured for communications with Unified Payment Gateway API 2740. Further, Merchant Portal 2738 is configured for communications with Event-based API 2742 and Access 2744. In addition, Browser 2732 is configured for communications with Firewall Service 2746, which is configured for communications with Merchant Portal 2738.

Figure 2L:
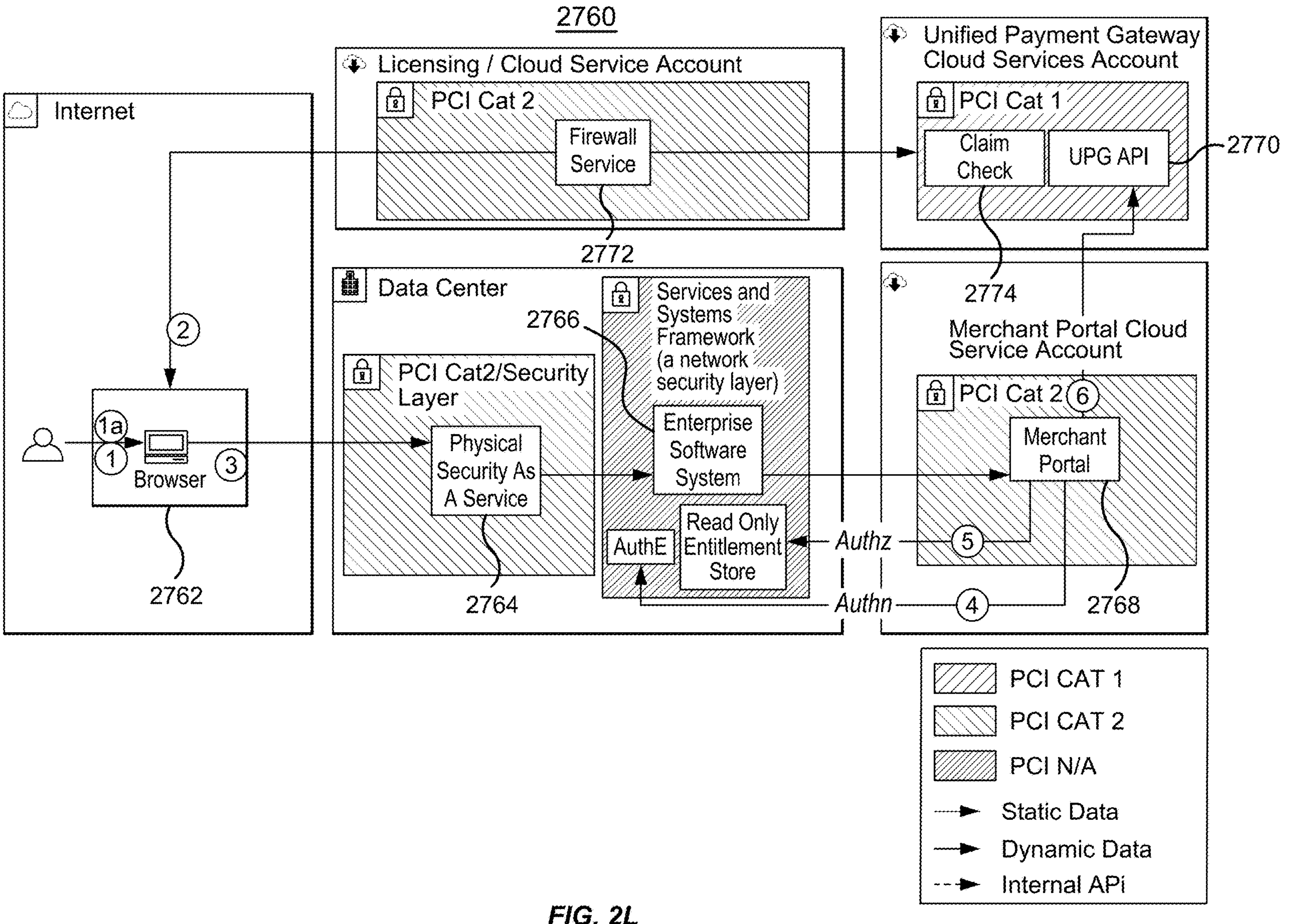
FIG. 2L is a block diagram illustrating an example, non-limiting embodiment of a system functioning in accordance with various aspects described herein.

Referring now to FIG. 2L, this is a block diagram illustrating an example, non-limiting embodiment of a system 2760 that can function in accordance with various aspects described herein (this diagram depicts certain aspects of PCI scoping options). As seen in this figure, a Browser 2762 (being operated by a user) is configured for communications with Physical Security As A Service (PSAAS) 2764, which is configured for communications with Enterprise Software System 2766, which is configured for communications with Merchant Portal 2768, which is configured for communications with Unified Payment Gateway API 2770. Further, Firewall Service 2772 is configured for communications with Browser 2762 and Claim Check 2774.

Still referring to FIG. 2L, it is noted that the Browser 2762 can display the Merchant Portal 2768 as follows (see call out number 1A): Merchant user accessing portal UI URL in browser, which renders content through Enterprise Software System 2766.

Still referring to FIG. 2L, it is noted that a sales flow can be as follows: User enters PAN data along with other required data on portal UI (see call out number 1); When merchant user submits sale button on portal UI, Browser 2762 first invokes UPG hosted claim check API to get representation for entered PAN data (see call out number 2); Portal UI sends representation along with other data to Merchant Portal 2768 through Enterprise Software System 2766 (see call out number 3); Merchant Portal 2768 validates user identity with AuthE (NWAPI—Event-based API) (see call out number 4); Merchant Portal 2768 validates user entitlements with ROES (see call out number 5); Merchant Portal 2768 submits Authorization request to UPG Payment API with representation (see call out number 6).

Figure 2M:
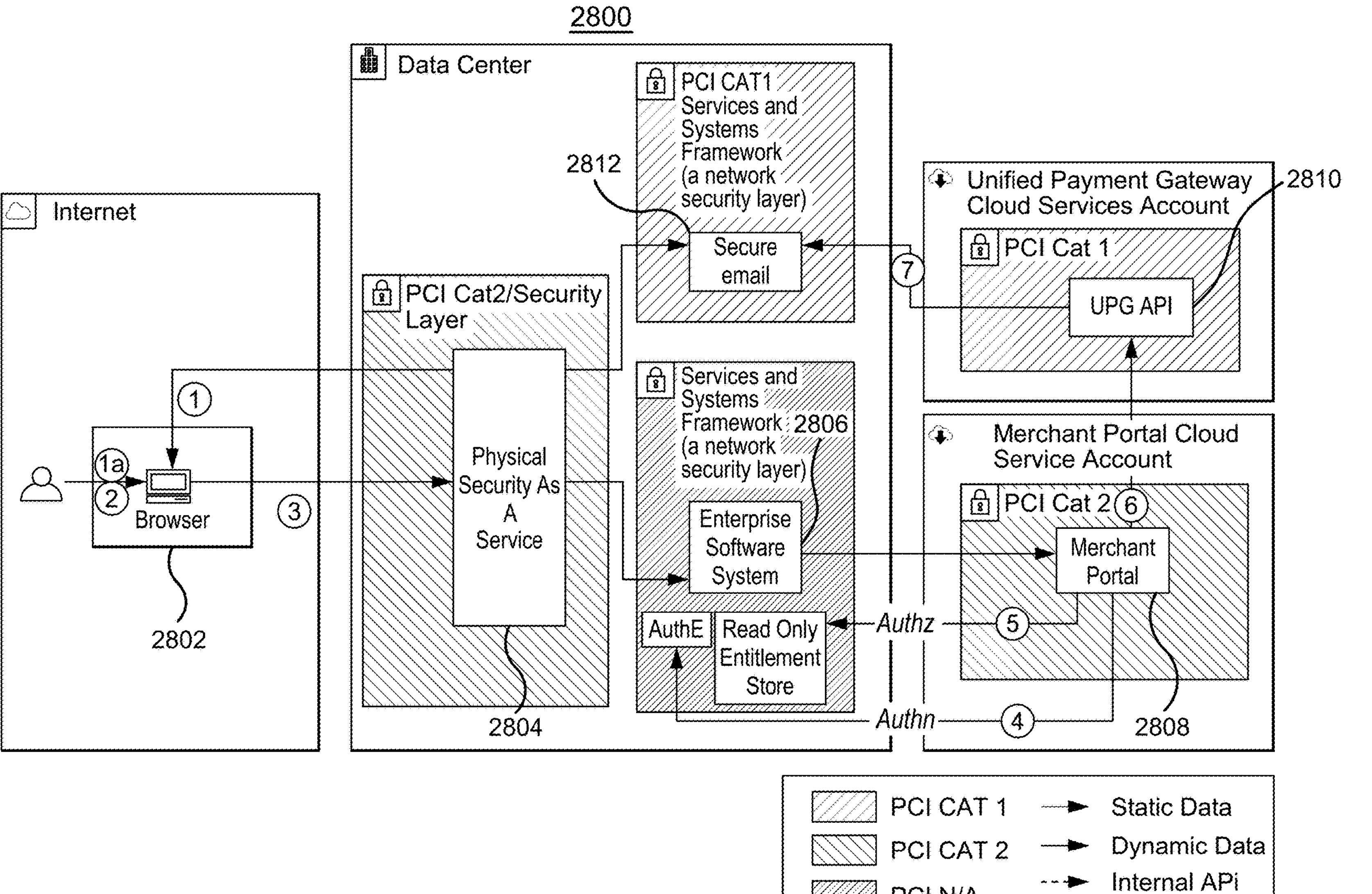
FIG. 2M is a block diagram illustrating an example, non-limiting embodiment of a system functioning in accordance with various aspects described herein.

Referring now to FIG. 2M, this is a block diagram illustrating an example, non-limiting embodiment of a system 2800 that can function in accordance with various aspects described herein (this diagram depicts certain aspects of PCI scoping options, including PIE encryption). As seen in this figure, a Browser 2802 (being operated by a user) is configured for communications with Physical Security As A Service (PSAAS) 2804, which is configured for communications with Enterprise Software System 2806, which is configured for communications with Merchant Portal 2808, which is configured for communications with Unified Payment Gateway API 2810, which is configured for communications with Secure email 2812. Further, Physical Security As A Service (PSAAS) 2804 is configured for communications with Secure email 2812.

Still referring to FIG. 2M, it is noted that the Browser 2802 can display the Merchant Portal 2808 as follows (see call out number 1a): Merchant user accessing portal UI URL in browser, which renders content through Enterprise Software System 2806.

Still referring to FIG. 2M, it is noted that a sales flow can be as follows: Browser 2802 calls Secure email 2812 to obtain an encryption key and encryption module (see call out number 1); Merchant user enters PAN data, which gets encrypted using key and module from step 1 (see call out number 2); Send encrypted PAN data along with other details to Merchant Portal 2808 through Enterprise Software System 2806 (see call out number 3); Merchant Portal 2808 validates user identity with AuthE (NWAPI—Event-based API) (see call out number 4); Merchant Portal 2808 validates user entitlements with ROES (see call out number 5); Merchant Portal 2808 submits authorization request to UPG Payment API 2810 with encrypted PAN data (see call out number 6); UPG API 2810 calls Secure email 2812 to get clear PAN data and process sales request (see call out number 7).

Figure 2N:
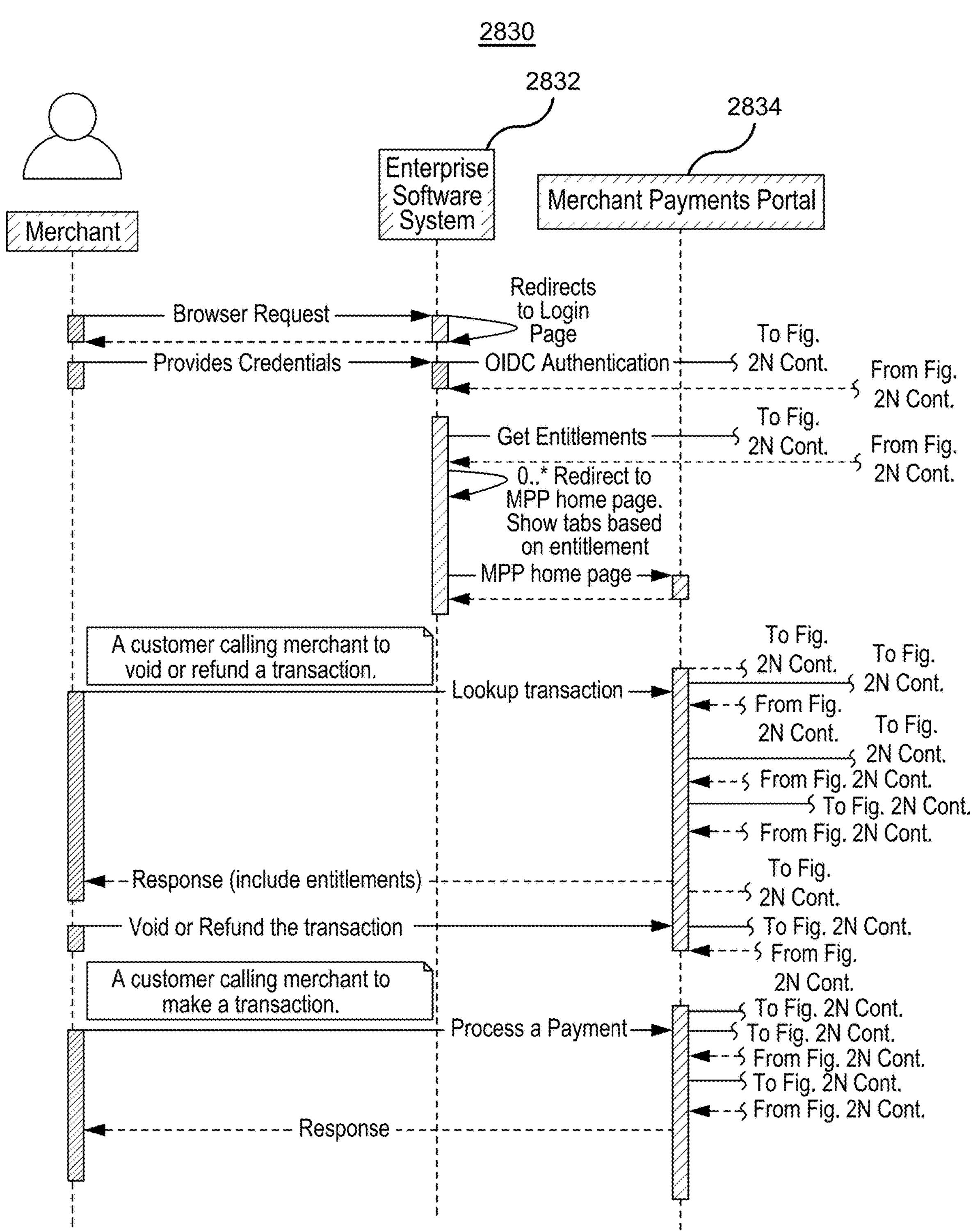
FIG. 2N is a block diagram illustrating an example, non-limiting embodiment of a system functioning in accordance with various aspects described herein.
Figure 2N:
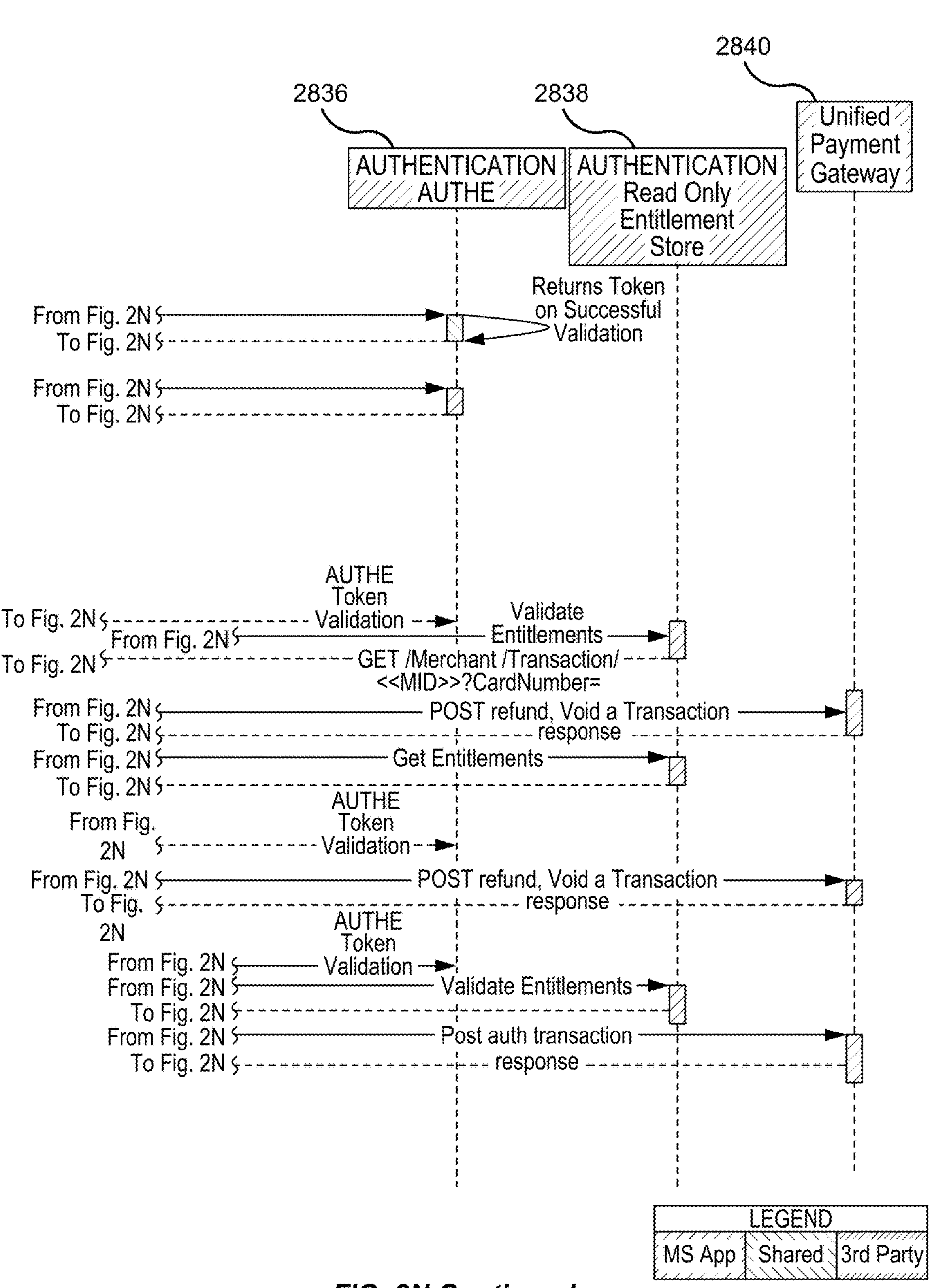

Referring now to FIG. 2N, this is a block diagram illustrating an example, non-limiting embodiment of a system 2830 that can function in accordance with various aspects described herein (this diagram depicts certain aspects of sequence flow, interaction, and data flow from the perspective of operational, security, and/or PCI concerns).

Still referring to FIG. 2N, it is seen that the system can operate as follows. First, a browser request is sent from a merchant browser to Enterprise Software System 2832, which redirects to Login Page. The merchant browser then provides credentials to Enterprise Software System 2832, which provides OIDC authorization to Authentication AUTHE 2836, which then returns a token on successful validation. Moreover, the Enterprise Software System 2832 gets entitlements from Authentication AUTHE 2836 and receives home page from Merchant Payments Portal (MPP) 2834.

Still referring to FIG. 2N, it is seen that in a case where (for example) a customer calls a merchant to void or refund a transaction, the merchant browser will communicate with MPP 2834 to lookup the transaction, The MPP 2834 will coordinate with Authorization ROES 2838 and Unified Payment Gateway 2840 to process the refund and/or void, and the MPP 2834 will further communicate with the merchant browser to complete the refund and/or void.

Still referring to FIG. 2N, it is seen that in a case where (for example) a customer calls a merchant to make a transaction, the merchant browser will communicate with MPP 2834 to process a payment, The MPP 2834 will coordinate with Authorization ROES 2838 and Unified Payment Gateway 2840 to process the transaction, and the MPP 2834 will further communicate with the merchant browser to complete the transaction.

Figure 2O:
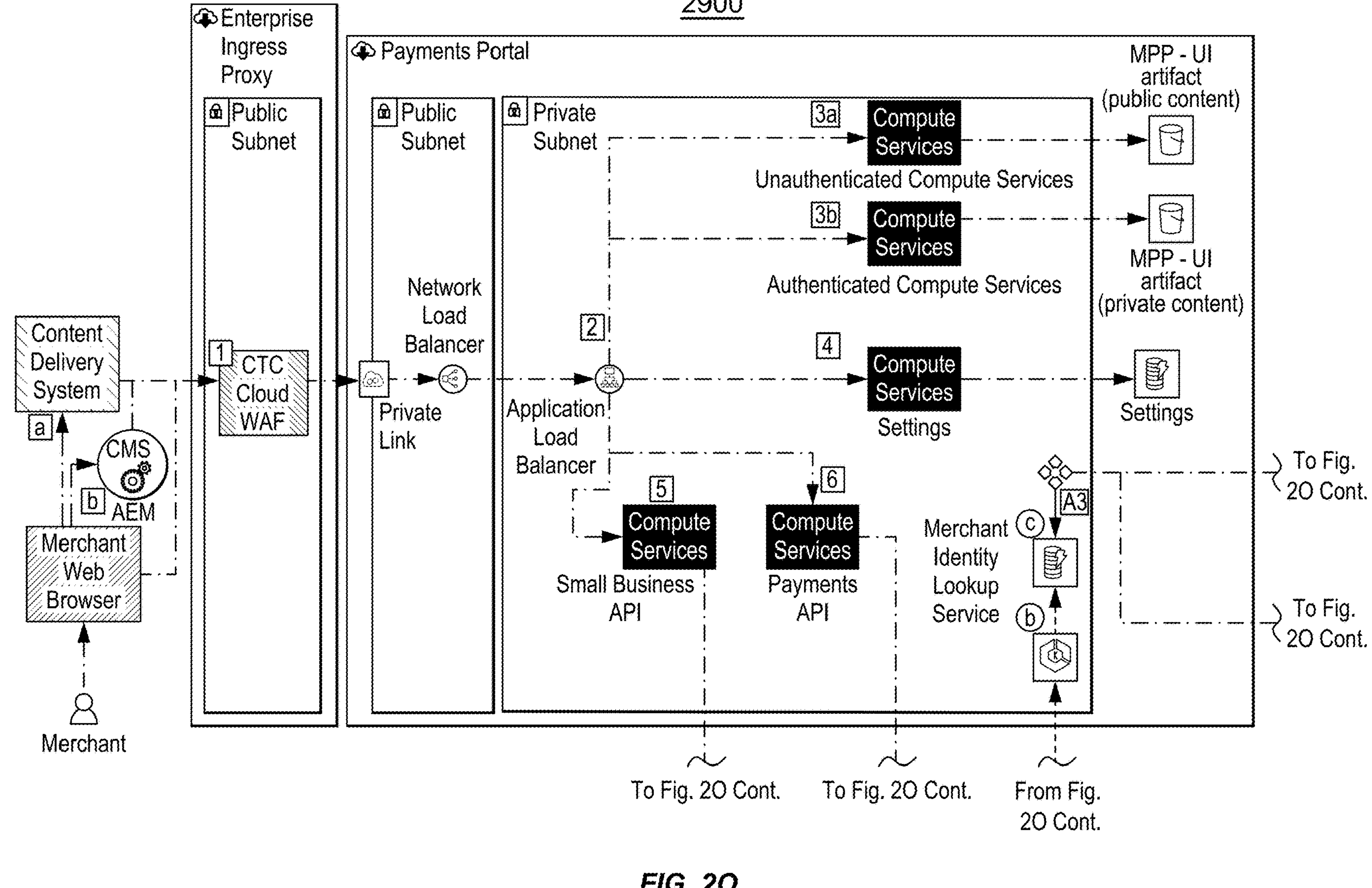
FIG. 2O is a block diagram illustrating an example, non-limiting embodiment of a system functioning in accordance with various aspects described herein.
Figure 2O:
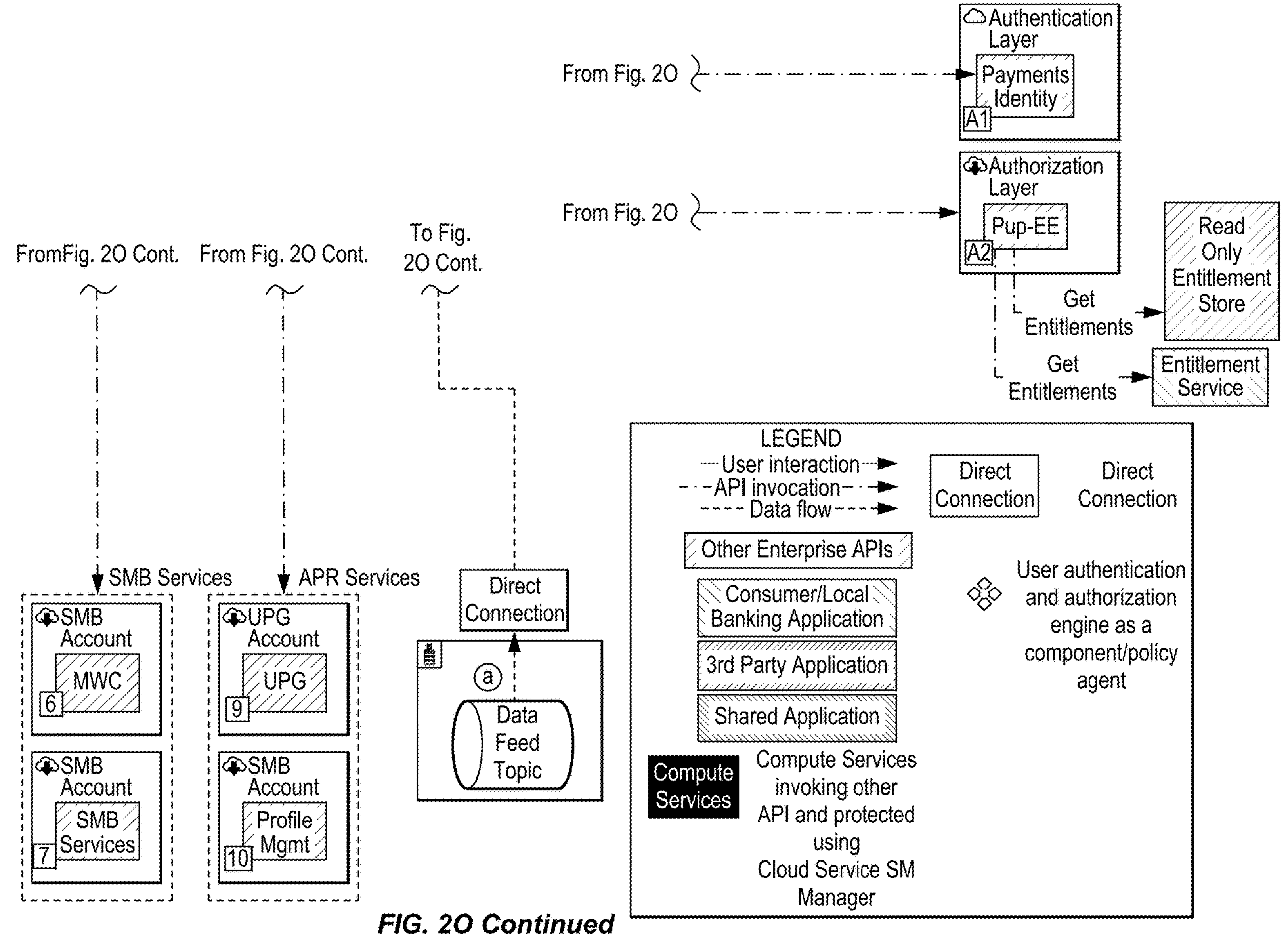
Figure 4:
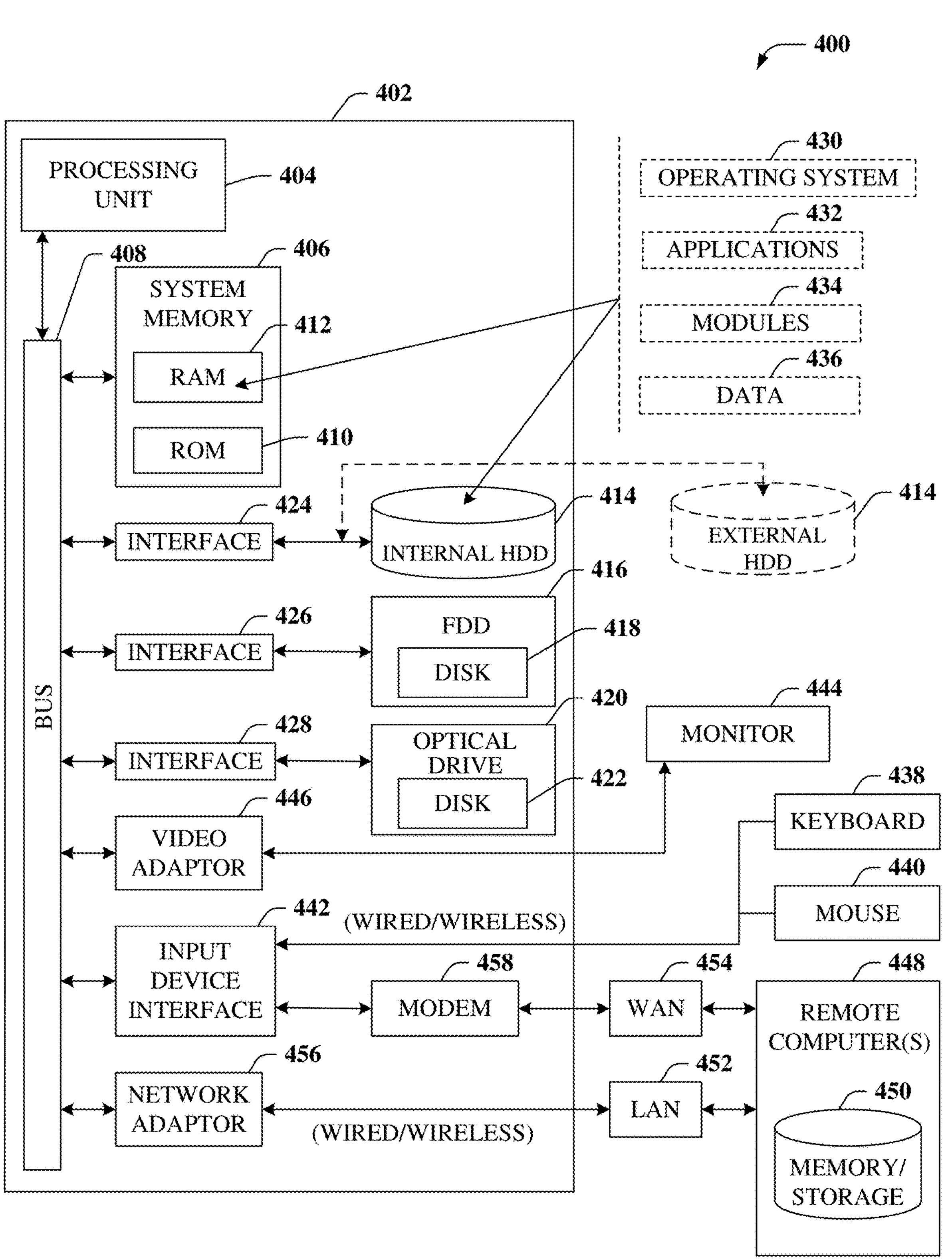

Referring now to FIG. 2O, this is a block diagram illustrating an example, non-limiting embodiment of a system 2900 that can function in accordance with various aspects described herein (this diagram depicts certain aspects of the deployed application components view within the infrastructure across multiple datacenters or globally). More particularly, as seen in this figure (which provides a deployment diagram), the system 2900 facilitates interaction with users and components.

Still referring to FIG. 2O, in operation, the system can facilitate the following functions associated with Merchant Portal—Unauthenticated User. More particularly (see call out number 3a), When an unauthenticated user comes to merchant portal, home page and other public information can be served through a compute service and s3 bucket. In order to paint the UI, the request enters the Cloud WAF (Firewall Service) and is routed through the private link established between the WAF and the MPP public subnet. Next (see call out letter a), a CDN can act as an edge cache for the static content stored in S3. This will require a lifecycle management and smooth integration between CDN and S3. Next (see call out letter b), in the future, various products can use a content management system (such as AEM) to manage any micro-site and publish them at ease.

Still referring to FIG. 2O, in operation, the system can facilitate the following functions associated with Merchant Portal—User Authentication and Post Authentication Flow. More particularly (see call out number 1), when DNS name is invoked, in order to paint the UI, the request enters the cloud WAF and is routed through the private link established between the WAF and MPP public subnet. Next (see call out number 2), a user request is routed to load balancers—NLB (layer 4) and ALB (layer 5). Next (see call out number 3), UI contents is retrieved from s3 bucket using a compute service (3a). Based on user trigger on a widget/redirect, Payments Identity—Authentication Platform (PAID) log page will be loaded. Once PAID has successfully authenticated the client, a token is passed on along with user redirect to 3b. Next (see call out number 4), user authentication token is validated on every HTTP request through A1, A2, A3, and corresponding applications are loaded using the user persona/entitlements. Next (see call out number 5), user authentication/entitlement is validated on every HTTP request. If valid, merchant profile is validated/looked up using the mid_lookup table before performing the user requested action. Next (see call out number 6), when a particular action is performed by the user, a corresponding action will be performed. For example (see call out number 9), when a client needs to look up a transaction, steps 1 through 3 will be followed and "Transaction lookup" compute service will take over the action based on the URI path. Also, the corresponding UPG API is invoked.

Still referring to FIG. 2O, a merchant profile event consumer process can proceed as follows. First (see call out letter a), when a new client (merchant) is onboarded or updated, real-time data feed topic will receive an event. Next (see call out letter b), a cloud authentication element consumes event as configured. Next (see call out letter c), a table will be updated with the merchant profile information.

Figure 1A:
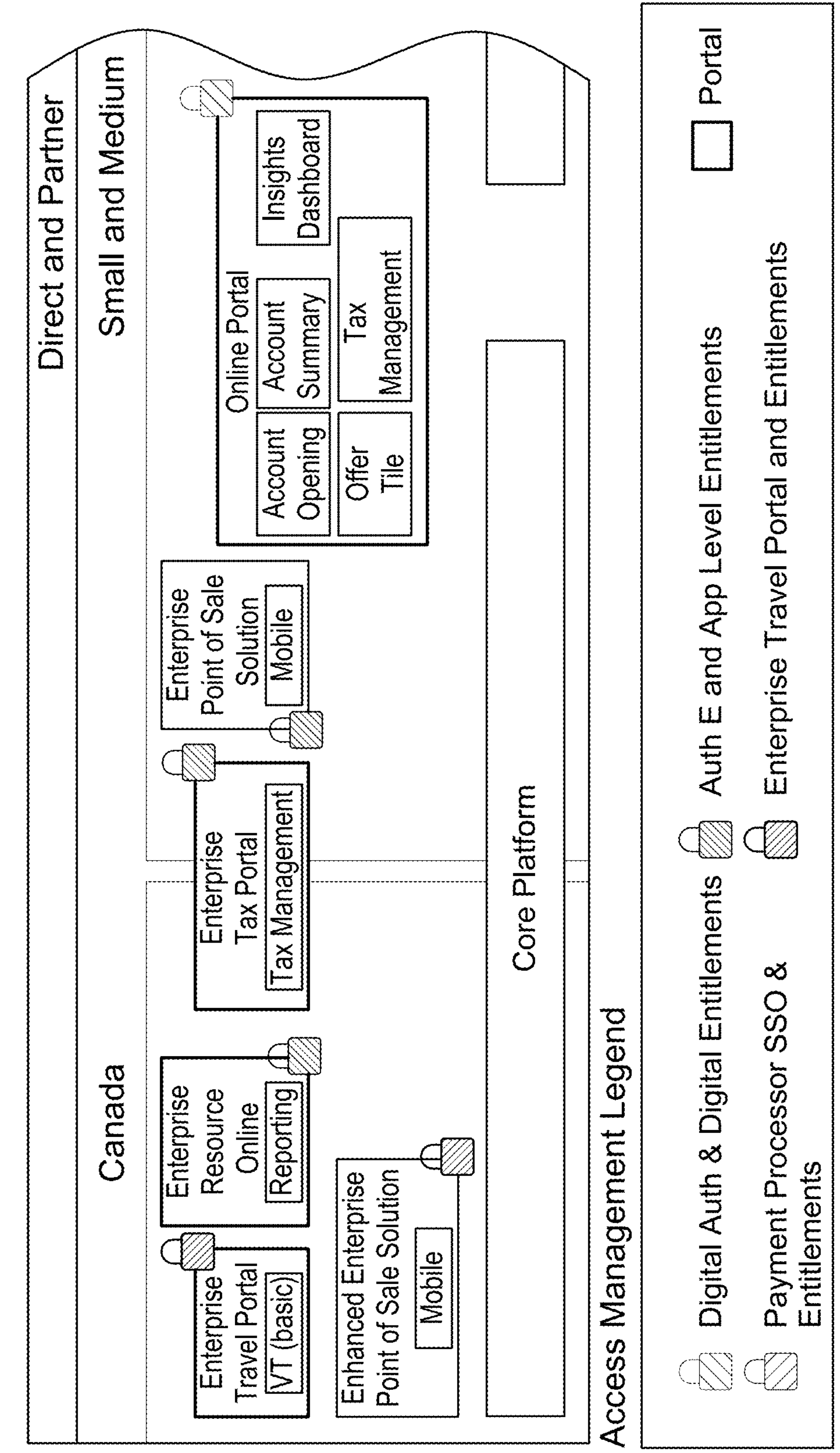
FIG. 1A is a block diagram of a conventional portal landscape.
Figure 1A:
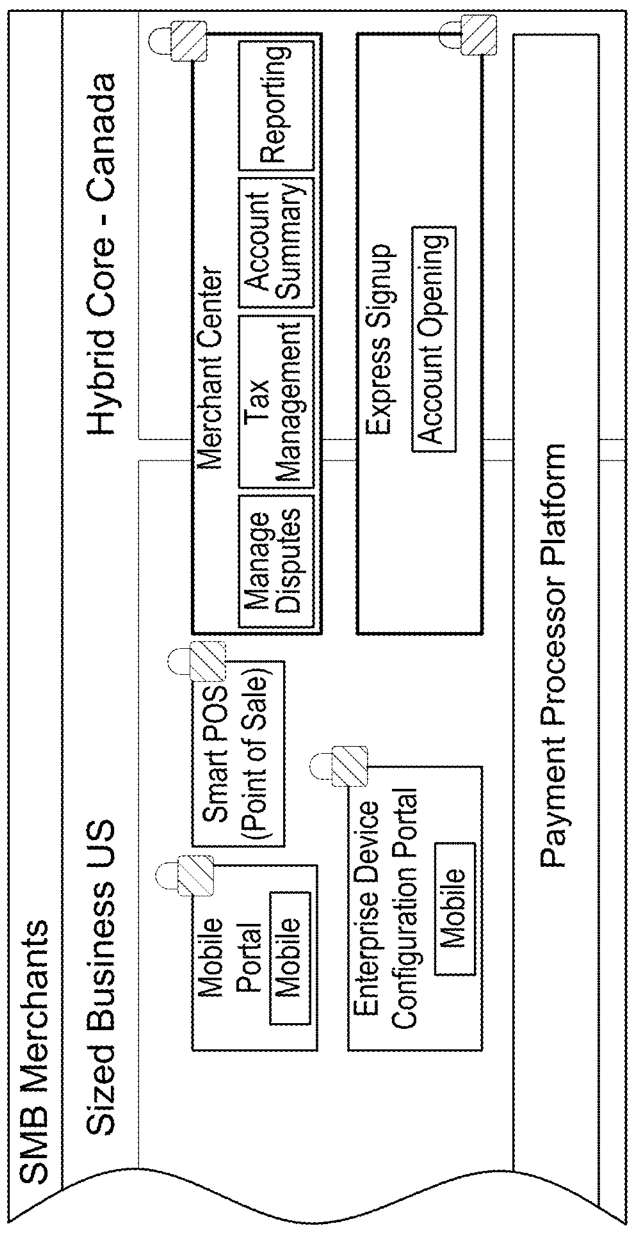
Figure 1B:
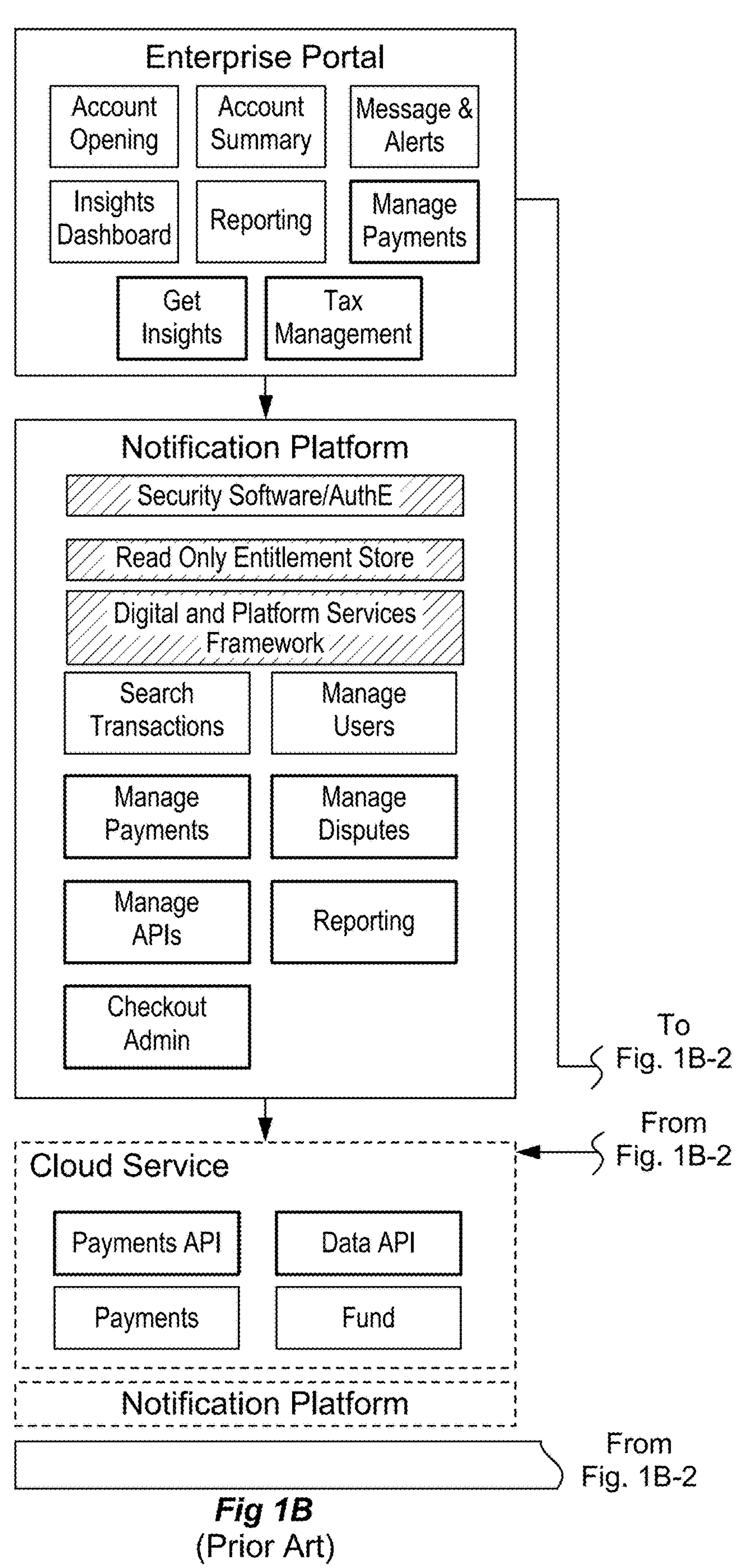
FIG. 1B (comprised of four drawing sheets labeled FIG. 1B, FIG. 1B-2, FIG. 1B-3, and FIG. 1B-4) is a block diagram of a conventional portal landscape.
Figures 1, 1B, 2:
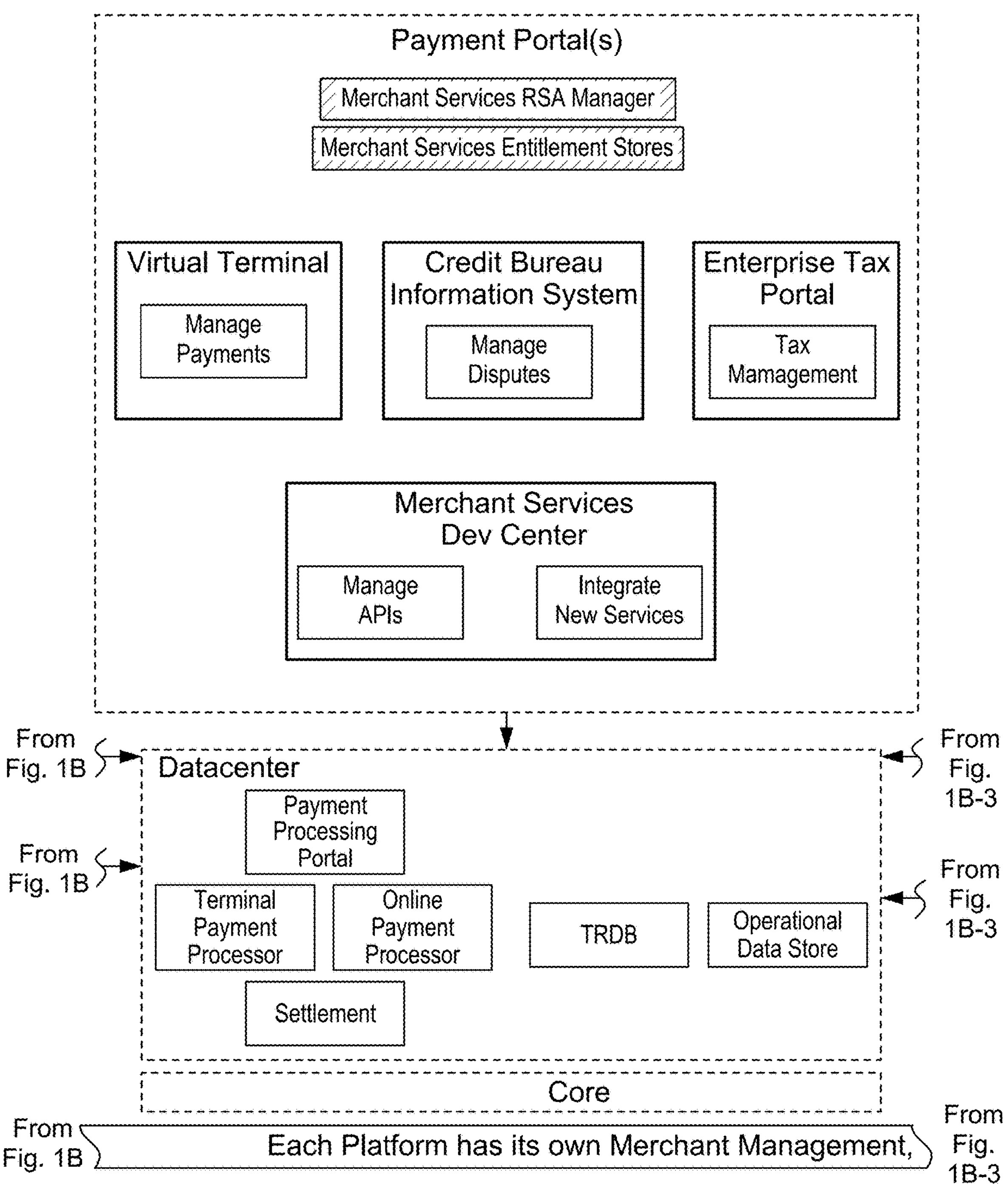
Figures 1, 1B, 2, 3:
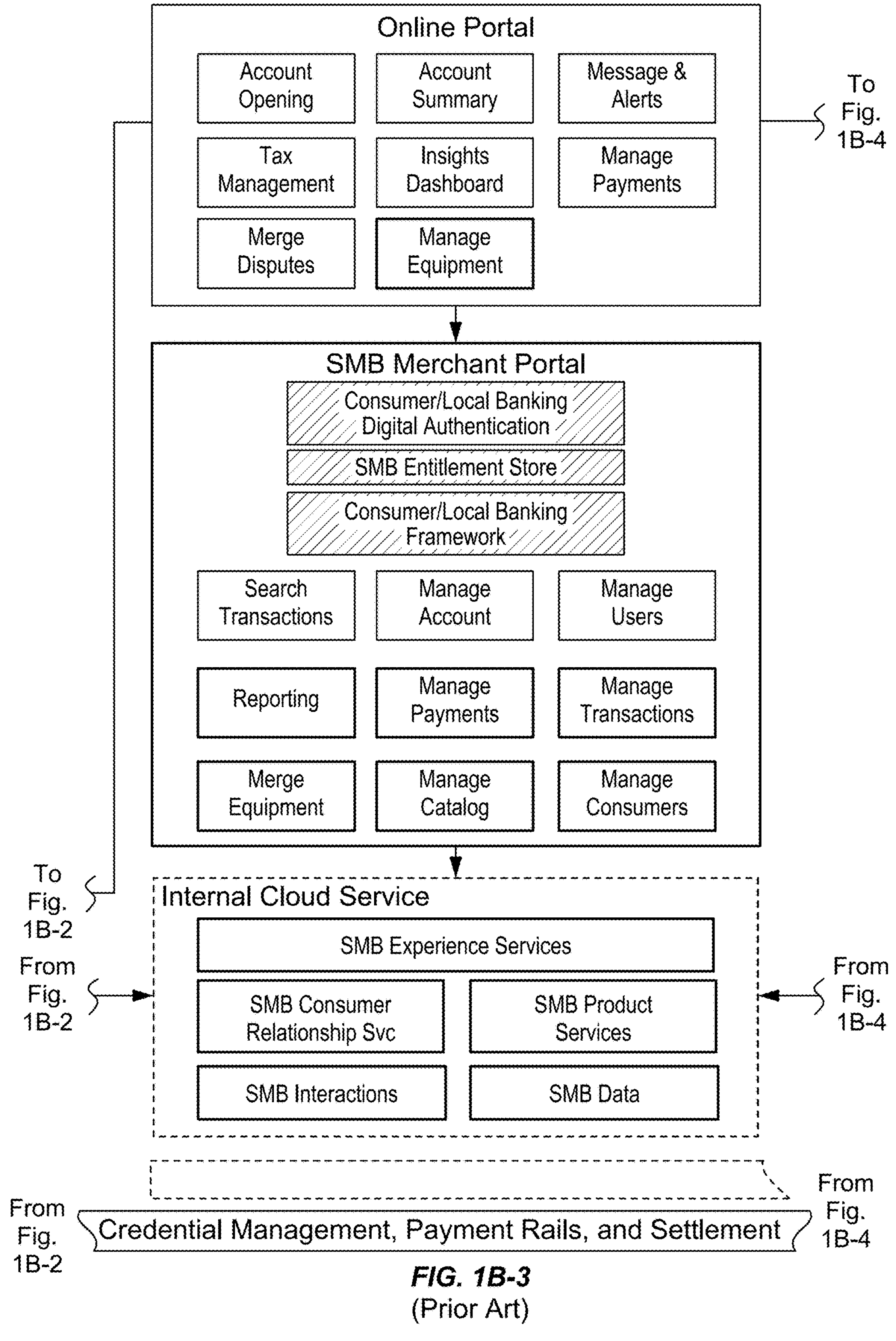

Referring now to FIG. 3A, various steps of a method 3000 according to an embodiment are shown. As seen in this FIG. 3A, step 3002 comprises receiving first communications that originate from a first computer used by a first user (e.g., an employee such as a customer service representative) of a plurality of users associated with a merchant (e.g., the employer of the customer service representative), wherein the first communications comprise first credential information (e.g., username and password; or a token from an authentication management system of the employer) that is used to authenticate the first user and that corresponds to a first role (e.g., customer service) via which the first user will perform a first action (e.g., a customer service action). Next, step 3004 comprises responsive to receipt of the first credential information, authenticating access to a product platform (e.g., infrastructure that provides a user interface and a group of software applications), wherein the authenticating of the access is based at least in part upon the first credential information, wherein the product platform is configured to facilitate a plurality of action types (e.g., customer service related action type, customer finance related action type, or merchant finance-related action type), wherein the plurality of action types comprises a first action type and a second action type, and wherein the second action type (e.g., customer finance related action type) is an action type that is different from the first action type (e.g., customer service related action type). Next, step 3006 comprises responsive to the authenticating of the access to the product platform and in accordance with the first role (e.g. customer service), selecting as permitted to be performed by the first user (e.g., the customer service representative) the first action type (e.g., customer service related action type). Next, step 3008 comprises facilitating on the product platform the first action of the first action type (e.g., customer service related action type) by the first user while concurrently prohibiting an action on the product platform of the second action type (e.g., customer finance related action type) by the first user. Next, step 3010 comprises receiving second communications that originate from a second computer used by a second user (e.g., an employee such as a finance person) of the plurality of users associated with the merchant (e.g., the employer of the finance person and the customer service representative), wherein the second communications comprise second credential information (e.g. another username and password; or another token from the authentication management system of the employer) that is used to authenticate the second user and that corresponds to a second role (e.g., customer finance) via which the second user will perform a second action (e.g., customer finance related action), wherein the second role is a different role from the first role. Next, step 3012 comprises responsive to receipt of the second credential information, further authenticating access to the product platform, wherein the further authenticating of the access is based at least in part upon the second credential information. Next, step 3014 comprises responsive to the further authenticating of the access to the product platform and in accordance with the second role (e.g., customer finance), selecting as permitted to be performed by the second user (e.g., the finance person) the second action type (e.g., customer finance related action type). Next, step 3016 comprises facilitating on the product platform the second action of the second action type (e.g., customer finance related action type) by the second user while concurrently prohibiting an action on the product platform of the first action type (e.g., customer service related action type) by the second user.

While for purposes of simplicity of explanation, the respective processes are shown and described as a series of blocks in FIG. 3A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3B, various steps of a method 3100 according to an embodiment are shown. As seen in this FIG. 3B, step 3102 comprises receiving at least one first communication that originates from a first computer system that is used by a first particular user (e.g., an employee such as a customer service representative) of a first plurality of users associated with a first merchant (e.g., the employer of the customer service representative), wherein the at least one first communication comprises first credential information (e.g., username and password; or a token from an authentication management system of the employer of the first particular user) that is used to authenticate the first particular user and that correlates to a first persona (e.g., customer service) via which the first particular user will perform a first action (e.g., a customer service action). Next, step 3104 comprises responsive to receipt of the first credential information, authenticating access to a product platform (e.g., infrastructure that provides a user interface and a group of software applications), wherein the authenticating of the access is based at least in part upon the first credential information, wherein the product platform is configured to facilitate a plurality of action types (e.g., customer service related action type, customer finance related action type, or merchant finance-related action type), wherein the plurality of action types comprises a first action type and a second action type, and wherein the second action type (e.g., customer finance related action type) is an action type that is different from the first action type (e.g., customer service related action type). Next, step 3106 comprises responsive to the authenticating of the access to the product platform and in accordance with the first persona (e.g. customer service), selecting as permitted to be performed by the first particular user the first action type (e.g., customer service related action type). Next, step 3108 comprises facilitating on the product platform the first action of the first action type (e.g., customer service related action type) by the first particular user while concurrently prohibiting an action on the product platform of the second action type (e.g., customer finance related action type) by the first particular user. Next, step 3110 comprises receiving at least one second communication that originates from a second computer system that is used by a second particular user (e.g., an employee such as a finance person) of a second plurality of users associated with a second merchant (e.g., another employer of the finance person) that is a different entity from the first merchant, and wherein the at least one second communication comprises second credential information (e.g. another username and password; or another token from another authentication management system of the another employer) that is used to authenticate the second particular user and that correlates to a second persona (e.g., customer finance) via which the second particular user will perform a second action (e.g., customer finance related action). Next, step 3112 comprises responsive to receipt of the second credential information, further authenticating access to the product platform, wherein the further authenticating of the access is based at least in part upon the second credential information. Next, step 3114 comprises responsive to the further authenticating of the access to the product platform and in accordance with the second persona (e.g., customer finance), selecting as permitted to be performed by the second particular user (e.g., the finance person) the second action type (e.g., customer finance related action type). Next, step 3116 comprises facilitating on the product platform the second action of the second action type (e.g., customer finance related action type) by the second particular user while concurrently prohibiting an action on the product platform of the first action type (e.g., customer service related action type) by the second particular user.

While for purposes of simplicity of explanation, the respective processes are shown and described as a series of blocks in FIG. 3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3C, various steps of a method 3200 according to an embodiment are shown. As seen in this FIG. 3C, step 3202 comprises receiving, by a processing system including a processor, first communications that originate from a first computer system that is used by a first user (e.g., an employee such as a customer service representative) of a first plurality of users associated with a first merchant (e.g., the employer of the customer service representative), wherein the first communications comprise first credential information (e.g., username and password; or a token from an authentication management system of the employer of the first user) that is used to authenticate the first user and that identifies a first role (e.g., customer service) via which the first user will perform a first action (e.g., a customer service action). Next, step 3204 comprises responsive to receipt of the first credential information, authenticating, by the processing system, access to a first product platform (e.g., infrastructure that provides a user interface and a group of software applications), wherein the authenticating of the access to the first product platform is based at least in part upon the first credential information, wherein the first product platform is configured to facilitate a first plurality of action types (e.g., customer service related action type, customer finance related action type, or merchant finance-related action type), wherein the first plurality of action types comprises a first action type and a second action type, and wherein the second action type (e.g., customer finance related action type) is an action type that is different from the first action type (e.g., customer service related action type). Next, step 3206 comprises responsive to the authenticating of the access to the first product platform and in accordance with the first role (e.g., customer service), selecting, by the processing system, as permitted to be performed by the first user the first action type (e.g., customer service related action type). Next, step 3208 comprises facilitating, by the processing system, on the first product platform the first action of the first action type (e.g., customer service related action type) by the first user while concurrently prohibiting an action on the first product platform of the second action type (e.g., customer finance related action type) by the first user. Next, step 3210 comprises receiving, by the processing system, second communications that originate from a second computer system that is used by a second user (e.g., an employee such as a finance person) of a second plurality of users associated with a second merchant (e.g., another employer of the finance person), wherein the second merchant is a different merchant from the first merchant, wherein the second communications comprise second credential information (e.g. another username and password; or another token from another authentication management system of the another employer) that is used to authenticate the second user and that identifies a second role (e.g., customer finance) via which the second user will perform a second action (e.g., customer finance related action), wherein the second role is a different role from the first role. Next, step 3212 comprises responsive to receipt of the second credential information, authenticating, by the processing system, access to a second product platform (e.g., another infrastructure that provides another user interface and another group of software applications), wherein the authenticating of the access to the second product platform is based at least in part upon the second credential information, wherein the second product platform is a different product platform from the first product platform, wherein the second product platform is configured to facilitate a second plurality of action types (e.g., customer service related action type, customer finance related action type, or merchant finance related action type), wherein the second plurality of action types comprises a third action type and a fourth action type, and wherein the fourth action type (e.g., customer service related action type) is an action type that is different from the third action type (e.g., customer finance related action type). Next, step 3214 comprises responsive to the authenticating of the access to the second product platform and in accordance with the second role (e.g., customer finance), selecting, by the processing system, as permitted to be performed by the second user the third action type (e.g., customer finance related action type). Next, step 3216 comprises facilitating, by the processing system, on the second product platform the second action of the third action type (e.g., customer finance related action type) by the second user while concurrently prohibiting an action on the second product platform of the fourth action type (e.g., customer service related action type) by the second user.

While for purposes of simplicity of explanation, the respective processes are shown and described as a series of blocks in FIG. 3C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, some portions of embodiments can be combined with portions of other embodiments.

As described herein, various embodiments can provide for a unified merchant portal where merchants and other clients can access their transaction history, manage transaction state, manage their user access and permissions, and configure product settings.

As described herein, various embodiments can provide for new SMB features and value-added offerings such as working capital, payroll, accounting.

As described herein, various embodiments can provide for a region agnostic and segment agnostic merchant portal. Such a region agnostic and segment agnostic merchant portal can provide (for example) a client experience in which: (a) enterprise or SMB merchants can access the same merchant portal; and (b) in the United States, SMB merchants have an option to access Online Portal or merchant portal directly.

As described herein, various embodiments can provide for a region agnostic and segment specific merchant portal. Such a region agnostic and segment specific merchant portal can provide (for example) a client experience in which: (a) in the United States, SMB merchants have an option to access Online Portal or merchant portal directly; and (b) non-United States SMB merchants can access the same merchant portal. Further, such a region agnostic and segment specific merchant portal can provide: (a) leveraging firm wide patterns, framework and infrastructure; (b) building & deploying end to end feature/functionality independently with low integration; and/or (c) reduced dependencies (e.g., manage the delivery of the SMB specific use cases without reliance on other teams).

As described herein, various embodiments can provide for a merchant portal that supports reporting and/or managing disputes capabilities.

As described herein, various embodiments can provide for a merchant portal that integrates with a Payment Processor (which can reside, for example, in a cloud architecture).

As described herein, various embodiments can provide for supporting merchants with a consistent and seamless portal experience. In various embodiments, a merchant portal can provide benefits including: a reduced number of entry points for SMB merchants, more consistent user experience, a reduced number of access management solutions, a reduction in redundant and duplicate capabilities/solutions, and/or a simplified omni-channel experience.

As described herein, various embodiments can provide for a simplified and modernized merchant experience (e.g., leveraging firm wide framework, patterns and infrastructure and/or enabling teams to code and deploy independently with low dependencies).

As described herein, various embodiments can provide a commerce center with personalized digital-first experiences for merchants (including reporting back office, for payments and recurring payment, and for sales and service). Various embodiments can allow merchants to view and modify the features in order to match their requirements. Various embodiments can implement a platform that manages how to authenticate and authorize, which language framework(s) to use, and other aspects of development.

As described herein, various embodiments can facilitate various merchant services via a SMB portal.

As described herein, various embodiments can facilitate a merchant portal that is region and segment agnostic.

As described herein, various embodiments can facilitate one or more of the following use cases (focused on external authentication): (a) as an SMB merchant user, be able to securely access SMB merchant portal externally (e.g., support Identity/Access Management Platform as Idp for SMB merchant portal); (b) as a SMB merchant user, be able to create user credentials which are unique across SMB segment, across region (e.g., support registration as a service to create unique user credentials for SMB merchants across regions); (c) as a SMB merchant user, be able to create sub-user credentials which are unique across SMB segment, across region (e.g., support registration as a service to create unique sub-user credentials for SMB merchants across regions); (d) as a SMB merchant user, be able to securely and seamless access a Payment Processor Merchant Center from SMB merchant portal (e.g., support federated model with Payment Processor SSO); (e) as a SMB merchant user, be able to securely and seamless access SMB merchant portal from Online Portal (e.g., support federated model with digital authentication); (f) as a SMB merchant user, be able to securely and seamless access other SMB channels externally (e.g., support federated model with Auth E (such as, for example, support existing core merchants)).

As described herein, various embodiments can facilitate value-added services (VAS) including one or more of the following: (a) merchant working capital; (b) integrated banking; (c) customer insights; (d) offers; (e) marketing; (f) invoicing; (g) payroll; (h) accounting; and/or (i) loyalty.

As described herein, various embodiments can implement a merchant portal platform which will enable clients (such as merchants) to perform the following actions on behalf of a consumer calling into the merchant's call center: (a) payment processing-authorize and capture, capture only; (b) manage transactions-void, refund (full or partial).

As described herein, various embodiments can provide an improved customer experience (e.g., improve the customer experience by enabling refunds and transaction management in a response portal).

As described herein, various embodiments can provide an ability to innovate, deliver and scale faster (e.g., by using public cloud for UX and/or backend services).

As described herein, various embodiments can provide for transaction management (e.g., search, void and refund features).

As described herein, various embodiments can provide for customer profile management.

As described herein, various embodiments can provide refund processing.

As described herein, various embodiments can utilize a unified API to provide functionality to lookup, authorize void, and/or refund on a given transaction.

As described herein, various embodiments can utilize a unified API to provide functionality to implement transaction search (e.g., transaction lifecycle lookup).

As described herein, various embodiments can implement fine grain entitlements for individual users.

As described herein, various embodiments can implement AuthE library for integration to container-less apps.

As described herein, various embodiments can provide for: (a) reduced number of entry points for SMB merchants; (b) more consistent user experiences; (c) reduced number of access management solutions (simplifying user and credential management); (d) reduction of redundant and duplicate capabilities/solutions; (e) digital support of global use cases; (f) reduced number of disparate UX frameworks; (g) certain platform/region based solutions that reduce implementation complexities and dependencies and reduce technical debt; and/or (h) simplified enablement of omni-channel experience.

As described herein, various embodiments can provide for: (a) reduced number of portal entry points for the client; (b) reduced number of disparate entitlement stores for user access and entitlements (simplifying user and credential management); (c) reduced number of disparate UX frameworks; (d) reduction of redundant and duplicate feature/capability solutions; (e) reductions in platform across multiple datacenters, private and public clouds; and/or (f) reduction of duplicative functionality.

As described herein, various embodiments can provide for: (a) reduction in a fragmented and disjointed client experience; (b) reduced investment in certain merchant portal feature functionality (by reducing need for multiple solutions); (c) reduced support required for certain duplicative features; (d) reduced operational risk (e.g., with regards to transaction history, transaction management and reporting); (e) increased product and feature parity; and/or (f) ability to rapidly achieve time to market for feature availability.

As described herein, various embodiments can provide for card processing (e.g., credit card processing).

As described herein, various embodiments can provide for a plurality of capabilities to be located at a single location (e.g., on a single server (or set of servers) that act as a transaction platform).

As described herein, various embodiments can provide for a portability of functionality.

As described herein, various embodiments can provide for utilization by segment (e.g., small merchant vs. enterprise).

As described herein, various embodiments can provide for utilization by role, persona, or the like (e.g., financial vs. customer rep, vs. dispute user).

As described herein, various embodiments can provide for a merchant payment service in which a merchant can use the same authentication and authorization mechanism for a plurality of different types of transactions (for example, a merchant user can be associated with 2 different persona, but nevertheless only needs one set of login data).

Figures 1, 1B, 2, 3, 4:
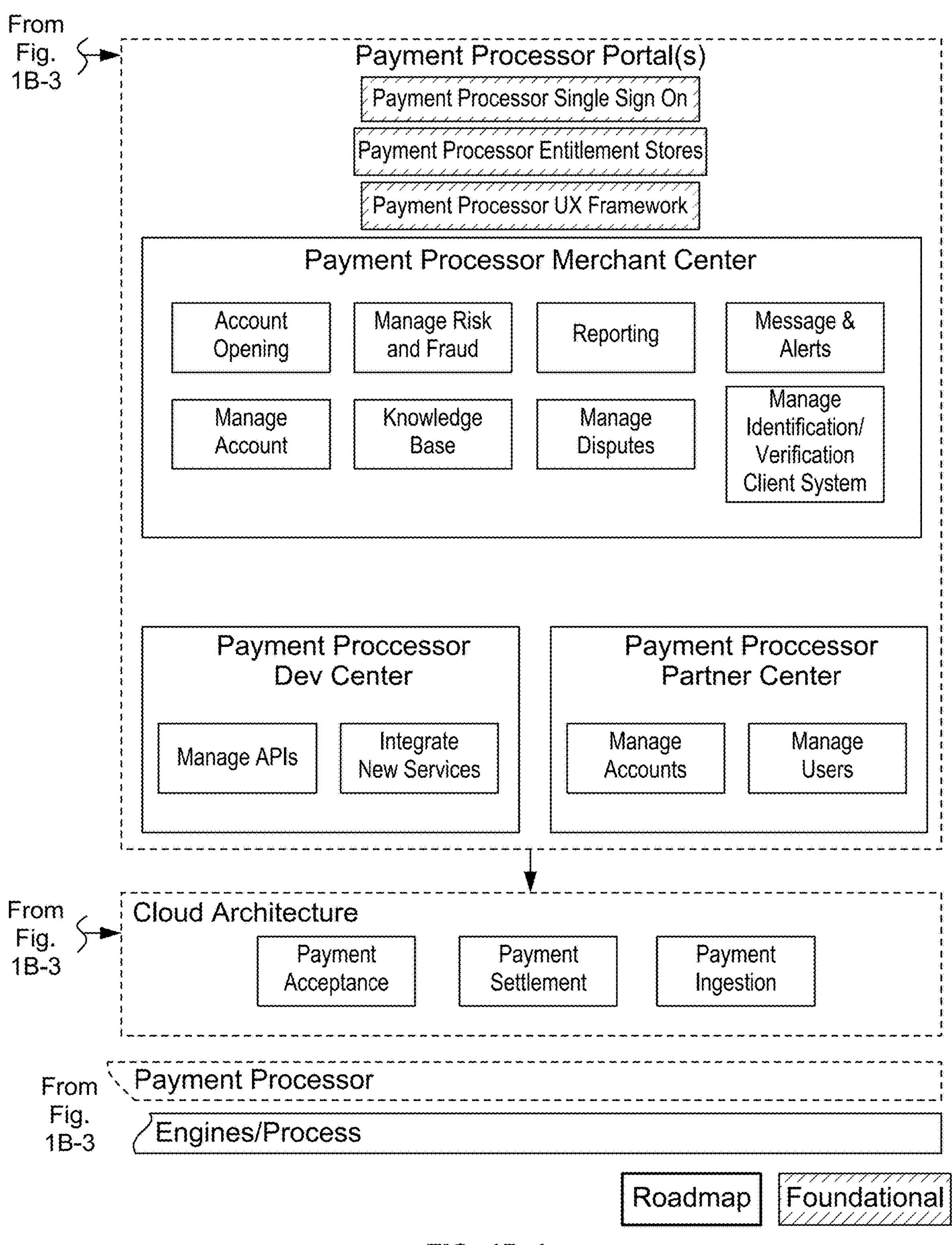
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, the computing environment 400 can be used in computing devices described herein. Each of these devices can be implemented via computer-executable instructions that can run on one or more computers, and/or in combination with other program modules and/or as a combination of hardware and software. For example, computing environment 400 can facilitate in whole or in part a unified merchant portal where merchants and other clients can access their transaction history, manage transaction state, manage their user access and permissions, and configure product settings. Further, each merchant portal, transaction platform, or the like can comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:

a processing system including a processor; and a memory that stores executable instructions that, when executed by the processing system, facilitate performance of operations, the operations comprising:

receiving first communications that originate from a first computer used by a first user of a plurality of users associated with a merchant, wherein the first communications comprise first credential information that is used to authenticate the first user and that corresponds to a first role via which the first user will perform a first action;

responsive to receipt of the first credential information, authenticating access to a product platform, wherein the authenticating of the access is based at least in part upon the first credential information, wherein the product platform is configured to facilitate a plurality of action types, wherein the plurality of action types comprises a first action type and a second action type, and wherein the second action type is an action type that is different from the first action type, wherein the first action type comprises a customer service action, wherein the second action type comprises a payment acceptance action;

responsive to the authenticating of the access to the product platform and in accordance with the first role, selecting as permitted to be performed by the first user the first action type;

facilitating on the product platform the first action of the first action type by the first user while concurrently prohibiting an action on the product platform of the second action type by the first user;

receiving second communications that originate from a second computer used by a second user of the plurality of users associated with the merchant, wherein the second communications comprise second credential information that is used to authenticate the second user and that corresponds to a second role via which the second user will perform a second action, wherein the second role is a different role from the first role;

responsive to receipt of the second credential information, further authenticating access to the product platform, wherein the further authenticating of the access is based at least in part upon the second credential information;

responsive to the further authenticating of the access to the product platform and in accordance with the second role, selecting as permitted to be performed by the second user the second action type; and facilitating on the product platform the second action of the second action type by the second user while concurrently prohibiting an action on the product platform of the first action type by the second user.

2. The device of claim 1, wherein the operations further comprise:

receiving third communications that originate from the first computer used by the first user, wherein the third communications comprise the first credential information that is used to authenticate the first user and that corresponds to a third role via which the first user will perform a third action, wherein the third role is a different role from the first role;

responsive to again receiving the first credential information, again authenticating access to the product platform, wherein the again authenticating of the access is based at least in part upon the first credential information;

responsive to the again authenticating of the access to the product platform and in accordance with the third role, selecting as permitted to be performed by the first user a third action type of the plurality of action types, wherein the third action type is a different action type from the first action type; and facilitating on the product platform the third action of the third action type by the first user while concurrently prohibiting an action on the product platform of the first action type by the first user and while concurrently prohibiting an action on the product platform of the second action type by the first user.

3. The device of claim 1, wherein:

the first computer comprises a first web browser, a first mobile device, a first smart point of sale device, or any combination thereof;

the second computer comprises a second web browser, a second mobile device, a second smart point of sale device, or any combination thereof;

the first user is a first employee of the merchant, a first contractor of the merchant, or a combination thereof;

the second user is a second employee of the merchant, a second contractor of the merchant, or a combination thereof the first credential information comprises a first username and a first password, a first token from an authentication management system of the merchant, or a combination thereof; and the second credential information comprises a second username and a second password, a second token from the authentication management system of the merchant, or a combination thereof.

4. The device of claim 1, wherein each action type of the plurality of action types comprises one of: the customer service action, a customer service related action type, a customer finance related action type, the payment acceptance action, or a merchant finance related action type.

5. The device of claim 4, wherein:

the customer service related action type relates to a customer complaint;

the customer finance related action type relates to a customer purchase, or a customer refund; and the merchant finance related action type relates to government taxes.

6. The device of claim 1, wherein:

the processing system comprises one or more first servers; and the product platform comprises one or more second servers.

7. The device of claim 6, wherein:

the one or more first servers is a same one or more servers as the one or more second servers.

8. The device of claim 1, wherein:

the first communications are received directly from one or more first servers, the first communications are received indirectly from one or more first servers, or any combination thereof;

the first communications are communicated via a first wired network, a first wireless network, a first intranet, Internet, or any combination thereof;

the second communications are received directly from one or more second servers, the second communications are received indirectly from one or more second servers, or any combination thereof; and the second communications are communicated via a second wired network, a second wireless network, a second intranet, the Internet, or any combination thereof.

9. The device of claim 1, wherein:

the authenticating of the access to the product platform comprises first bi-directional communications between the first computer that is used by the first user and the processing system; and the further authenticating of the access to the product platform comprises second bi-directional communications between the second computer that is used by the second user and the processing system.

10. The device of claim 1, wherein:

the first communications comprise first data to facilitate the first action of the first action type by the first user; and the second communications comprise second data to facilitate the second action of the second action type by the second user.

11. A non-transitory machine-readable medium comprising executable instructions that, when executed by a processing system including a processor, facilitate performance of operations, the operations comprising:

receiving at least one first communication that originates from a first computer system that is used by a first particular user of a first plurality of users associated with a first merchant, wherein the at least one first communication comprises first credential information that is used to authenticate the first particular user and that correlates to a first persona via which the first particular user will perform a first action;

responsive to receipt of the first credential information, authenticating access to a product platform, wherein the authenticating of the access is based at least in part upon the first credential information, wherein the product platform is configured to facilitate a plurality of action types, wherein the plurality of action types comprises a first action type and a second action type, and wherein the second action type is an action type that is different from the first action type, wherein the first action type comprises a customer service action, wherein the second action type comprises a payment acceptance action;

responsive to the authenticating of the access to the product platform and in accordance with the first persona, selecting as permitted to be performed by the first particular user the first action type;

facilitating on the product platform the first action of the first action type by the first particular user while concurrently prohibiting an action on the product platform of the second action type by the first particular user;

receiving at least one second communication that originates from a second computer system that is used by a second particular user of a second plurality of users associated with a second merchant that is a different entity from the first merchant, and wherein the at least one second communication comprises second credential information that is used to authenticate the second particular user and that correlates to a second persona via which the second particular user will perform a second action;

responsive to receipt of the second credential information, further authenticating access to the product platform, wherein the further authenticating of the access is based at least in part upon the second credential information;

responsive to the further authenticating of the access to the product platform and in accordance with the second persona, selecting as permitted to be performed by the second particular user the second action type; and facilitating on the product platform the second action of the second action type by the second particular user while concurrently prohibiting an action on the product platform of the first action type by the second particular user.

12. The non-transitory machine-readable medium of claim 11, wherein each of the plurality of action types comprises a respective one of the customer service action, a customer complaint related action, a customer purchase related action, a customer refund related action, the payment acceptance action, or a government taxes related action.

13. The non-transitory machine-readable medium of claim 11, wherein:

a first entity operates the processing system; and a second entity operates the product platform.

14. The non-transitory machine-readable medium of claim 13, wherein the first entity is a same entity as the second entity.

15. A method comprising:

receiving, by a processing system including a processor, first communications that originate from a first computer system that is used by a first user of a first plurality of users associated with a first merchant, wherein the first communications comprise first credential information that is used to authenticate the first user and that identifies a first role via which the first user will perform a first action;

responsive to receipt of the first credential information, authenticating, by the processing system, access to a first product platform, wherein the authenticating of the access to the first product platform is based at least in part upon the first credential information, wherein the first product platform is configured to facilitate a first plurality of action types, wherein the first plurality of action types comprises a first action type and a second action type, and wherein the second action type is an action type that is different from the first action type, wherein the first action type comprises a customer service action, wherein the second action type comprises a payment acceptance action;

responsive to the authenticating of the access to the first product platform and in accordance with the first role, selecting, by the processing system, as permitted to be performed by the first user the first action type;

facilitating, by the processing system, on the first product platform the first action of the first action type by the first user while concurrently prohibiting an action on the first product platform of the second action type by the first user;

receiving, by the processing system, second communications that originate from a second computer system that is used by a second user of a second plurality of users associated with a second merchant, wherein the second merchant is a different merchant from the first merchant, wherein the second communications comprise second credential information that is used to authenticate the second user and that identifies a second role via which the second user will perform a second action, wherein the second role is a different role from the first role;

responsive to receipt of the second credential information, authenticating, by the processing system, access to a second product platform, wherein the authenticating of the access to the second product platform is based at least in part upon the second credential information, wherein the second product platform is a different product platform from the first product platform, wherein the second product platform is configured to facilitate a second plurality of action types, wherein the second plurality of action types comprises a third action type and a fourth action type, and wherein the fourth action type is an action type that is different from the third action type;

responsive to the authenticating of the access to the second product platform and in accordance with the second role, selecting, by the processing system, as permitted to be performed by the second user the third action type; and facilitating, by the processing system, on the second product platform the second action of the third action type by the second user while concurrently prohibiting an action on the second product platform of the fourth action type by the second user.

16. The method of claim 15, wherein:

the first computer system comprises a first web browser, a first mobile device, a first smart point of sale device, or any combination thereof;

the second computer system comprises a second web browser, a second mobile device, a second smart point of sale device, or any combination thereof;

the first user is a first employee of the first merchant, a first contractor of the first merchant, or a combination thereof;

the second user is a second employee of the second merchant, a second contractor of the second merchant, or a combination thereof;

the first credential information comprises a first username and a first password, a first token from an authentication management system of the first merchant, or a combination thereof; and the second credential information comprises a second username and a second password, a second token from an authentication management system of the second merchant, or a combination thereof.

17. The method of claim 15, wherein:

the first product platform is capable of carrying out actions with first other users independent of the processing system;

the second product platform is capable of carrying out actions with second other users independent of the processing system; or any combination thereof.

18. The method of claim 17, wherein:

the first product platform is operated by a first entity;

the second product platform is operated by a second entity; and the first entity is a different entity from the second entity.

19. The method of claim 15, wherein:

at least part of the first communications originate from the first computer system responsive to first input by the first user; and at least part of the second communications originate from the second computer system responsive to second input by the second user.

20. The method of claim 15, wherein:

the first user is an employee of the first merchant, a contractor of the first merchant, or any combination thereof; and the second user is an employee of the second merchant, a contractor of the second merchant, or any combination thereof.

* * * * *